(12) United States Patent
Anandan et al.

(10) Patent No.: US 6,198,852 B1
(45) Date of Patent: Mar. 6, 2001

(54) VIEW SYNTHESIS FROM PLURAL IMAGES USING A TRIFOCAL TENSOR DATA STRUCTURE IN A MULTI-VIEW PARALLAX GEOMETRY

(75) Inventors: Padmananbhan Anandan, Issaquah, WA (US); Michal Irani, Rehovot; Daphna Weinshall, Jerusalem, both of (IL)

(73) Assignees: Yeda Research and Development Co., Ltd.; Yissum Research Development Co. of the Hebrew University of Jerusalem, both of (IL); Microsoft Corporation, Redmond, WA (US)

( * ) Notice: Subject to any disclaimer, the term of this patent is extended or adjusted under 35 U.S.C. 154(b) by 0 days.

(21) Appl. No.: 09/088,543

(22) Filed: Jun. 1, 1998

(51) Int. Cl.[7] ...................................................... G06K 9/36

(52) U.S. Cl. .......................... 382/284; 382/103; 382/154; 345/419

(58) Field of Search .................................... 382/103, 107, 382/154, 284, 289, 201; 345/419, 427

(56) References Cited

U.S. PATENT DOCUMENTS

| 5,703,961 | * | 12/1997 | Rogina et al. | 382/154 |
|---|---|---|---|---|
| 5,710,875 | * | 1/1998 | Harashima et al. | 345/419 |
| 5,821,943 | * | 10/1998 | Shashua | 382/201 |
| 5,937,105 | * | 8/1999 | Katayama et al. | 382/293 |
| 5,963,664 | * | 10/1999 | Kumar et al. | 382/154 |

FOREIGN PATENT DOCUMENTS

97/35161  *  9/1997  (WO) .............................. G01B/11/04

OTHER PUBLICATIONS

Avidan, Shai and Shashua, Amnon, "Novel View Synthesis in Tensor Space," IEEE Conference on Computer Vision and Pattern Recognition, pp. 1034–1040, San Juan, Jun. 1997.

Carlsson, Stefan and Weinshall, Daphna, "Dual Computation of Projective Shape and Camera Positions From Multiple Images," *IJCV*, pp. 227–241, 1998.

(List continued on next page.)

*Primary Examiner*—Amelia Au
*Assistant Examiner*—Jingge Wu
(74) *Attorney, Agent, or Firm*—Michaelson & Wallace; Peter L. Michaelson; Robert M. Wallace

(57) ABSTRACT

The invention is embodied in a process for synthesizing a new image representing a new viewpoint of a scene from at least two existing images of the scene taken from different respective viewpoints. The process begins by choosing a planar surface visible in the at least two of the existing images and transforming the at least two existing images relative to one another so as to bring the planar surface into perspective alignment in the at least two existing images, and then choosing a reference frame and computing parallax vectors between the two images of the projection of common scene points on the reference frame.

Preferably, the reference frame comprises an image plane of a first one of the existing images. Preferably, the reference frame is co-planar with the planar surface. In this case, the transforming of the existing images is achieved by performing a projective transform on a second one of the existing images to bring its image of the planar surface into perspective alignment with the image of the planar surface in the first existing image.

Preferably, the image parameter of the new view comprises information sufficient, together with the parallax vectors, to deduce: (a) a trifocal ratio in the reference frame and (b) one epipole between the new viewpoint and one of the first and second viewpoints.

43 Claims, 10 Drawing Sheets

OTHER PUBLICATIONS

Faugeras, O.D., "What can be seen in three dimensions with an uncalibrated stereo rig?," European Conference on Computer Vision, pp. 563–578, Santa Margarita Ligure, May 1992.

Hartley, Richard, "Lines and points in three views—a unified approach," DARPA Image Understanding Workshop Proceedings, pp. 1009–1016, 1994.

Irani, M. and Anandan, P., "Parallax geometry of pairs of points for 3d scene analysis," European Conference on Computer Vision, pp. 17–30, Cambridge, UK, Apr. 1996.

Kumar, Rakesh, Anandan, P., and Hanna, Keith, "Direct recovery of shape from multiple views: a parallax based approach," IEEE, pp. 685–688, 1994.

Spetsakis, Minas E. and Aloimonos, John, "Structure From Motion Using Line Correspondence," *IJCV*, pp. 171–183, 1990.

Weinshall, Daphna, Werman, Michael, and Shashua, Amnon, "Shape Tensors for Efficient and Learnable Indexing," *IEEE*, pp. 58–65, 1995.

* cited by examiner

VIEW SYNTHESIS FROM PLURAL IMAGES USING A TRIFOCAL TENSOR DATA STRUCTURE IN A MULTI-VIEW PARALLAX GEOMETRY

BACKGROUND OF THE INVENTION

1. Technical Field

The present invention relates to an image processing method and apparatus employing multi-view parallax geometry. In one application, a previously unknown view from a new perspective of 3-dimensional objects is rendered from 2-dimensional images taken from different perspectives.

2. Background Art

The analysis of 3D scenes from multiple perspective images has been a topic of considerable interest in the vision literature. For the sake of clarity, this specification refers to published techniques described in this literature where appropriate, and for the sake of brevity such references are made to the following publications by the numbers given below in brackets (e.g., "[3]"):

References

[1] G. Adiv. Inherent ambiguities in recovering 3-d motion and structure from a noisey flow field. *IEEE Trans. on Pattern Analysis and Machine Intelligence*, pages 477–489, May 1989.

[2] S. Avidan and A. Shashua. Novel view synthesis in tensor space. In *IEEE Conference on Computer Vision and Pattern Recognition*, pages 1034–1040, San-Juan, June 1997.

[3] S. Carlsson. Duality of reconstruction and positioning from projective views. In *Workshop on Representations of Visual Scenes*, 1995.

[4] S. Carlsson and D. Weinshall. Dual Computation of Projective Shape and Camera Positions from Multiple Images. In *International Journal of Computer Vision, in press.*

[5] H. S. M Coxeter, editor. *Projective Geometry*. Springer Verlag, 1987.

[6] O. D. Faugeras. What can be seen in three dimensions with an uncalibrated stereo rig? In *European Conference on Computer Vision*, pages 563–578, Santa Margarita Ligure, May 1992.

[7] O. D. Faugeras and B. Mourrain. On the geometry and algebra of the point and line correspondences between n images. In *International Conference on Computer Vision*, pages 951–956, Cambridge, Mass., June 1995.

[8] Olivier Faugeras. *Three-Dimensional Computer Vision—A Geometric View-point*. MIT Press, Cambridge, Mass., 1996.

[9] Richard Hartley. Lines and poins in three views—a unified approach. In *DARPA Image Understanding Workshop Proceedings*, 1994.

[10] Richard Hartley. Euclidean Reconstruction from Uncalibrated Views. In *Applications of Invariance in Computer Vision*, J. L. Mundy, D. Forsyth, and A. Zisserman (Eds.), Springer-Verlag, 1993.

[11] M. Irani and P. Anandan. Parallax geometry of pairs of points for 3d scene analysis. In *European Conference on Computer Vision*, Cambridge, UK, April 1996.

[12] M. Irani, B. Rousso, and S. Peleg. Computing occluding and transparent motions. *International Journal of Computer Vision*, 12(1):5–16, January 1994.

[13] M. Irani, B. Rousso, and P. peleg. Recovery of ego-motion using region alignment. *IEEE Trans. on Pattern Analysis and Machine Intelligence*, 19(3):268–272, March 1997.

[14] R. Kumar, P. Anandan, and K. Hanna. Direct recovery of shape from multiple views: a parallax based approach. In *Proc 12th ICPR*, 1994.

[15] H. C. Longuet-Higgins. A computer algorithm for reconstructing a scene from two projections. *Nature*, 293:133–135, 1981.

[16] R. Mohr. Accurate Projective Reconstruction In *Applications of Invariance in Computer Vision*, J. L. Mundy, D. Forsyth, and A. Zisserman, (Eds.), Springer-Verlag, 1993.

[17] A. Shashua. Algebraic functions for recognition. *IEEE Transactions on Pattern Analysis and Machine Intelligence*, 17:779–789, 1995.

[18] A. Shashua and N. Navab. Relative affine structure: Theory and application to 3d reconstruction from perspective views. In *IEEE Conference on Computer Vision and Pattern Recognition*, pages 483–489, Seattle, Wash., June 1994.

[19] A. Shashua and P. Ananadan. Trilinear Constraints revisited: generalized trilinear constraints and the tensor brightness constraint. IUW, February 1996.

[20] P.H.S. Torr. Motion Segmentation and Outlier Detection. PhD Thesis: *Report No. OUEL* 1987/93, Univ. of Oxford, UK, 1993.

[21] M. Spetsakis and J. Aloimonos. A unified theory of structure from motion. *DARPA Image Understanding Workshop*, pp.271–283, Pittsburgh, Pa., 1990.

[22] D. Weinshall, M.Werman, and A. Shashua. Shape descriptors: Bilinear, tri-linear and quadlinear relations for multi-point geometry, and linear projective reconstruction algorithms. In *Workshop on Representations of Visual Scenes*, 1995.

As set forth in the foregoing literature, given two calibrated cameras, their relative orientations can be determined by applying the epipolar constraint to the observed image points, and the 3D structure of the scene can be recovered relative to the coordinate frame of a reference camera (referred to here as the reference frame—e.g., see [15, 8]). This is done by using the epipolar constraint and recovering the "Essential Matrix" E which depends on the rotation R and translation T between the two cameras. Constraints directly involving the image positions of a point in three calibrated views of a point have also been derived [21].

If the calibration of the cameras is unavailable, then it is known that reconstruction is still possible from two views, but only up to a 3D projective transformation [6]. In this case the epipolar constraint still holds, but the Essential Matrix is replaced by the "Fundamental Matrix", which also incorporates the unknown camera calibration information. The 3D scene points, the camera centers and their image positions are represented in 3D and 2D projective spaces (using homogeneous projective coordinates). In this case, the "reference frame" reconstruction may either be a reference camera coordinate frame [10], or as defined by a set of 5 basis points in the 3D world [16]. A complete set of constraints relating the image positions of multiple points in multiple views have been derived [7, 17]. Alternatively, given a projective coordinate system specified by 5 basis points, the set of constraints directly relating the projective coordinates of the camera centers to the image measurements (in 2D projective coordinates) and their dual constraints relating to the projective coordinates of the 3D scene points have also been derived [3, 22].

Alternatively, multiple uncalibrated images can be handled using the "plane+parallax" (P+P) approach, which analyzes the parallax displacements of a point between two views relative to a (real or virtual) physical planar surface II in the scene [18, 14, 13]. The magnitude of the parallax displacement is called the "relative-affine structure" in [18]. [14] shows that this quantity depends both on the "Height" H of P from Π and its depth Z relative to the reference camera. Since the relative-affine-structure measure is relative to both the reference frame (through Z) and the reference plane (through H), this specification refers to the P+P framework also as the "reference-frame+reference-plane" formulation.

Using the P+P formulation, [17] derived "tri-linear" constraints involving image positions of a point in three uncalibrated views. The P+P has the practical advantage that it avoids the inherent ambiguities associated with estimating the relative orientation (rotation+translation) between the cameras; this is because it requires only estimating the nomography induced by the reference plane between the two views, which folds together the rotation and translation. Also, when the scene is "flat", the F matrix estimation is unstable, whereas the planar homography can be reliably recovered [20].

SUMMARY OF THE INVENTION

The invention provides a new geometrical framework for processing multiple 3D scene points from multiple uncalibrated images, based on decomposing the projection of these points on the images into two stages: (i) the projection of the scene points onto a (real or virtual) physical reference planar surface in the scene to create a virtual "image" on the reference plane, and (ii) the re-projection of the virtual image onto the actual image plane of the camera. The positions of the virtual image points are directly related to the 3D locations of the scene points and the camera centers relative to the reference plane alone. All dependency on the internal camera calibration parameters and the orientation of the camera are folded into homographies relating each image plane to the reference plane.

Bi-linear and tri-linear constraints involving multiple points and views are given a concrete physical interpretation in terms of geometric relations on the physical reference plane. In particular, the possible dualities in the relations between scene points and camera centers are shown to have simple and symmetric mathematical forms.

In contrast to the plane+parallax (p+p) representation, which also uses a reference plane, the present invention removes the dependency on a reference image plane and extends the analysis to multiple views. This leads to simpler geometric relations and complete symmetry in multi-point multi-view duality.

The simple and intuitive expressions derived in the reference-plane based formulation lead to useful applications in 3D scene analysis. In particular, simpler tri-focal constraints are derived that lead to simple methods for New View Synthesis. The invention provides advantages over conventional plane+parallax (p+p) representation: by removing the reliance on the reference image plane, the invention obtains simpler geometric relations which facilitate the simple and intuitive methods discovered in the invention for new view synthesis.

The invention removes the dependency on the reference frame of the analysis of multi-point multi-view geometry. The invention breaks down the projection from 3D to 2D into 2 operations: the projection of the 3D world onto the 2D reference plane Π, followed by a 2D projective transformation (homography) which maps the reference plane to the image plane. Given the "virtual images" formed by the projection onto the reference plane, algebraic and geometric relations are derived involving the image locations of multiple points in multiple views in these virtual images, in accordance with the invention.

The positions of virtual image points are directly related to the 3D locations of the scene points and the camera centers relative to the reference plane alone. All dependency on the internal camera calibration parameters and the orientation of the camera are folded into homographies relating each image plane to the reference plane. This facilitates a structure measure that depends only on the heights of the scene points relative to the reference plane.

More particularly, the invention is embodied in a process for synthesizing a new image representing a new viewpoint of a scene from at least two existing images of the scene taken from different respective viewspoints. The process begins by choosing a planar surface visible in the at least two of the existing images and transforming the at least two existing images relative to one another so as to bring the planar surface into perspective alignment in the at least two existing images, and then choosing a reference frame and computing parallax vectors between the two images of the projection of common scene points on the reference frame. The user specifies an image parameter on the reference frame of the new viewpoint. From this, the process constructs from the image parameter and from the parallax vectors a trifocal tensor data structure. The process can then compute scene points in the new view from the scene points in the existing images using the trifocal tensor data structure, to produce the synthesized new view image.

Preferably, the reference frame comprises an image plane of a first one of the existing images. Preferably, the reference frame is co-planar with the planar surface. In this case, the transforming of the existing images is achieved by performing a projective transform on a second one of the existing images to bring its image of the planar surface into perspective alignment with the image of the planar surface in the first existing image.

Preferably, the image parameter of the new view comprises information sufficient, together with the parallax vectors, to deduce: (a) a trifocal ratio in the reference frame and (b) one epipole between the new viewpoint and one of the first and second viewpoints. In one embodiment, the image parameter of the new view comprises the trifocal ratio and the one epipole. In another embodiment, the image parameter of the new view comprises the projection onto the reference frame from the new viewpoint of at least two different scene points visible in the existing images. In the latter embodiment, the step of constructing a trifocal tensor data structure is achieved by computing, from the parallax vectors and from the projection of the scene points, three epipoles corresponding to views of each one of the two visible scene points from, respectively, the first viewpoint, the second viewpoint and the new viewpoint. In this case, the step of constructing a trifocal tensor data structure further includes the steps of computing from the three epipoles a trifocal ratio, and then computing elements of the trifocal tensor data structure from the trifocal ratio and from the three epipoles.

In another embodiment, the image parameter of the new view is information sufficient, together with the parallax vectors, to compute three epipoles on the reference frame corresponding to pairs of the first, second and new viewpoints. In this embodiment, the image parameter of the new view is the three epipoles themselves. In this case, the step of constructing a trifocal tensor data structure further includes the steps of computing from the three epipoles a trifocal ratio, and then computing elements of the trifocal tensor data structure from the trifocal ratio and from the three epipoles.

In an alternative implementation of the latter embodiment, the image parameter of the new view is the projection onto the reference frame from the new viewpoint of at least two different scene points visible in the existing images. In this case, the step of constructing a trifocal tensor data structure is carried out by computing, from the parallax vectors and from the projection of the scene points, three epipoles corresponding to views of each one of the two visible scene points from, respectively, the first viewpoint, the second viewpoint and the new viewpoint. Moreover, in this case the step of constructing a trifocal tensor data structure further includes computing from the three epipoles a trifocal ratio, and then computing elements of the trifocal tensor data structure from the trifocal ratio and from the three epipoles.

The process further includes transforming the synthsized new view image by a projective transform corresponding to a nomography between the reference frame and the new viewpoint.

BRIEF DESCRIPTION OF THE DRAWINGS

FIG. 15C is a synthesized view of the same scene from a third perspective reconstructed from the actual images of FIGS. 15A and 15B, while

DETAILED DESCRIPTION OF THE PREFERRED EMBODIMENTS

Introduction:

The invention involves the discovery of a complete set dual relationships involving 2 and 3 points in 2 and 3 views. On the reference plane the multi-point multi-view geometry is simple and intuitive. These relations are directly related to physical points on the reference plane such as the epipole and the dual-epipole [11]. These points are identified in the description below. Also, the description below introduces two new entities called the focal line and the dual focal-line which are analagous to the epipole and the dual-epipole when considering three-view and three-point geometries on the reference plane. Structures such as the fundamental matrix and the trilinear tensor have a rather simple form and depend only on the epipoles, and nothing else. The symmetry between points and cameras is complete, and they can be simply switched around to get from the epipolar geometry to the dual-epipolar geometry.

The simple and intuitive expressions derived in the reference-plane based formulation in this specification lead to useful applications in 3D scene analysis. In particular, simpler tri-focal constraints are derived, and these lead to simple methods for New View Synthesis. This specification includes an illustrative example of New-View Synthesis to demonstrate the feasibility of our approach. Also, the separation and compact packing of the unknown camera calibration and orientation into the 2D projection transformation (a homography) that relates the image plane to the reference plane, leads to potentially powerful reconstruction and calibration algorithms. For instance, based on minimal partial domain information, partial calibration and partial reconstruction can be achieved.

Figure 1:
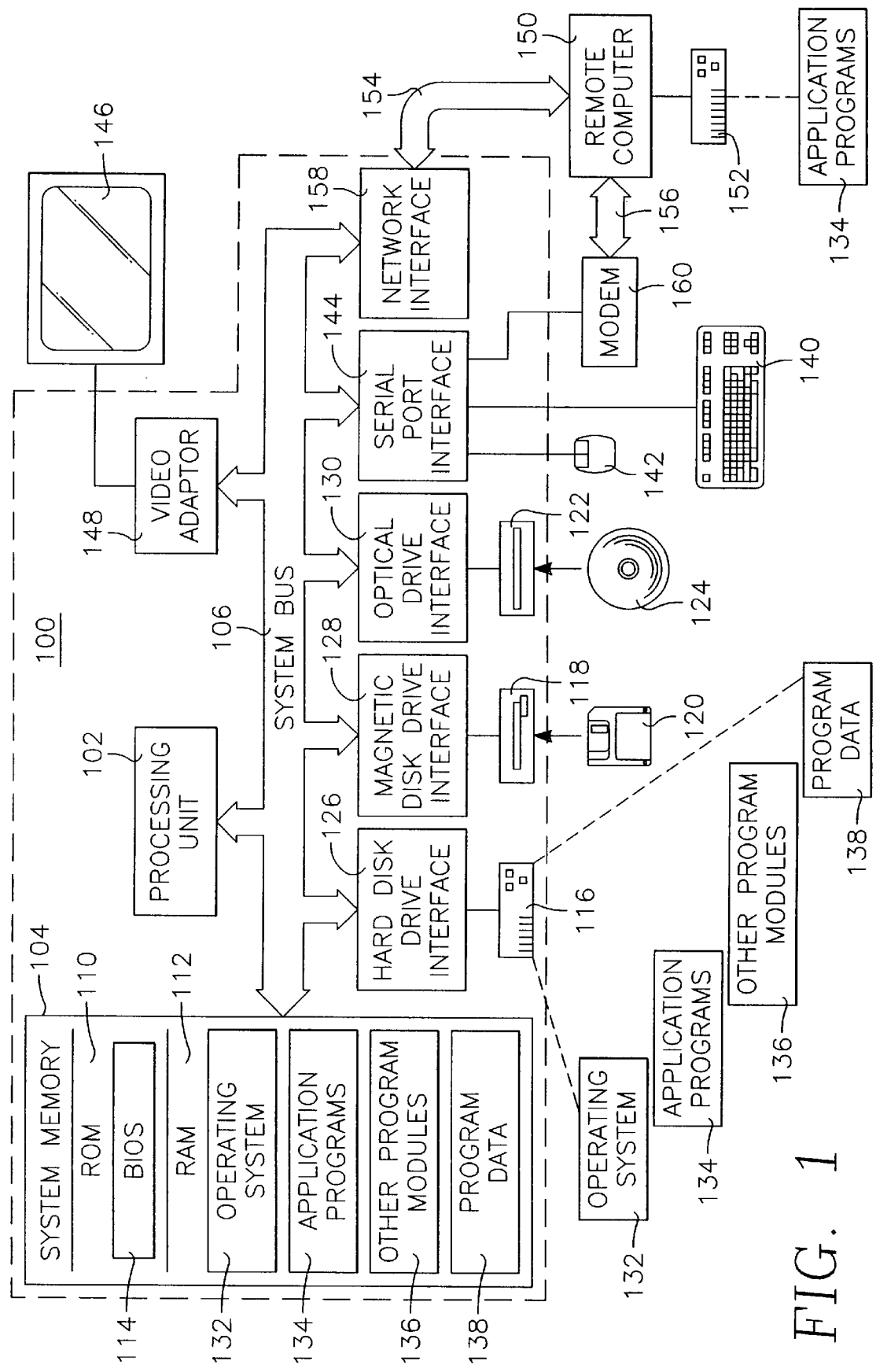
FIG. 1 illustrates a computer system and apparatus for carrying out the invention.

Processing System Environment for Carrying Out the Invention:

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include processes, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic process that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Two View Geometry on the Reference Plane

Figure 2A:
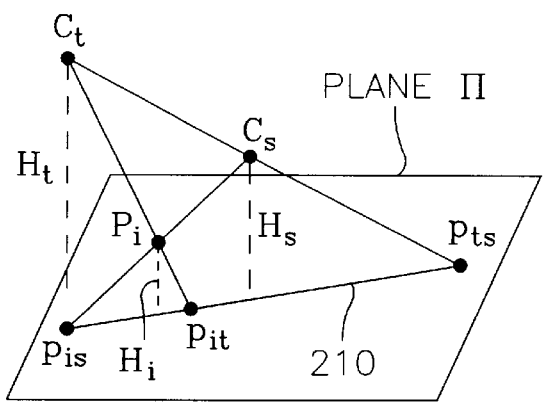
FIG. 2A illustrates a reference plane representation in which the object points are projected onto the reference plane, removing the dependency on the reference image plane.
Figure 2B:
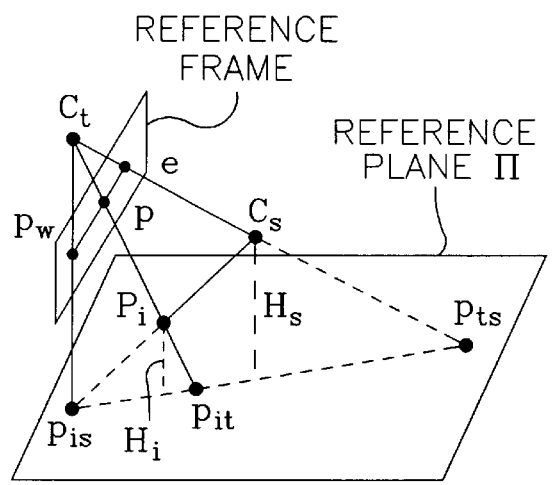
FIG. 2B corresponds to FIG. 2A and illustrates the re-projection of the reference plane image onto a reference frame (camera "t").

FIGS. 2A and 2B illustrate the reference plane representation. FIG. 2A illustrates the projection of the points onto the reference plane itself, removing the dependency on the reference image plane. $p_{ts}$ is the epipole, and line 210 is the epipolar line. FIG. 2B illustrates the re-projection of the reference plane image onto a reference image frame or "reference frame" (i.e., camera "t").

FIGS. 2A and 2B thus illustrate the two stage decomposition of the image formation process. FIG. 2A shows the projection of one scene point from two camera centers onto the reference plane Π. FIG. 2B shows the re-projection from the plane to one of the camera image planes (the "reference frame").

This specification adopts the following notations: P denotes scene points in 3D, C denotes camera centers; i,j,k are indices used for scene points (e.g., $P_i$) and r,s,t are indices used for camera centers (e.g., $C_r$). Also, $p_{ir}$ denotes the projection of the scene point $P_i$ through camera center $C_r$. It is the intersection of the ray $P_iC_t$ with the reference plane Π. Similarly $p_{is}$ is the intersection of $P_iC_s$ with the reference plane. This specification defines $p_{it}$ and $p_{is}$ as the "virtual-images" of $P_i$ on the reference plane from cameras $C_t$ and $C_s$ respectively. This specification defines the intersection of $C_tC_s$ with Π as the "epipole" on Π. $p_{ts}$ denotes the epipole. Note that the location of the epipole $p_{ts}$ on the reference plane Π is independent of the orientations and the internal calibration parameters of the cameras s and t.

To derive the algebraic constraints involving multiple points in multiple views, we define a coordinate system (x,y,Z) relative to the reference plane Π, where (x,y) are parallel to Π and Z is perpendicular to it. For points on the reference plane, we define Z=1, for other points we define Z=H+1, where H denotes the height (i.e., the perpendicular distance) of the point from the plane H. Thus, $P_i=(x_i,y_i,Z_i)$, where $Z_i=H_i+1$, denotes the 3D coordinates of the scene point $P_i$. Similarly $C_t=(x_t,y_t,Z_t)^T$, where $Z_t=H_t+1$, and and $C_s=(x_s,y_s,Z_s)^T$, where $Z_s=H_s+1$. The points $p_{it},p_{is}$ and $p_{ts}$ on the reference plane are the intersections of the lines $C_tP_i$, $C_sP_i$, and $C_tC_s$ with the reference plane Π:

$$p_{it} = \begin{pmatrix} x_{it} \\ y_{it} \\ 1 \end{pmatrix} = \begin{pmatrix} \frac{H_i x_t - H_t x_i}{H_i - H_t} \\ \frac{H_i y_t - H_t y_i}{H_i - H_t} \\ 1 \end{pmatrix} \quad p_{is} = \begin{pmatrix} x_{it} \\ y_{it} \\ 1 \end{pmatrix} = \begin{pmatrix} \frac{H_i x_s - H_s x_i}{H_i - H_s} \\ \frac{H_i y_s - H_s y_i}{H_i - H_s} \\ 1 \end{pmatrix} \quad (1)$$

$$p_{ts} = \begin{pmatrix} x_{ts} \\ y_{ts} \\ 1 \end{pmatrix} = \begin{pmatrix} \frac{H_s x_t - H_t x_s}{H_s - H_t} \\ \frac{H_s y_t - H_t y_s}{H_s - H_t} \\ 1 \end{pmatrix} \quad (2)$$

Note that the expressions given above do not involve any of the camera internal calibration parameters or the orientations of the image planes. Also note that there is only a single epipole for each pair of views, which is unlike the case of the reference-frame based formulation, which involves two epipoles, one on each image frame.

The points $p_{it}$, $p_{is}$ and $p_{ts}$ on the reference plane are related to their corresponding points on an image plane (e.g., a reference frame) via a single 2D projective transformation, which is the homography between that reference frame and the reference plane Π. FIG. 2B shows the re-projection onto the reference frame t—the points $p,p_w$, and e are the projections of the image points $p_{it},p_{is}$, and the epipole $p_{ts}$ respectively.

There are two basic results concerning two views of a point as observed on the reference plane Π. The first is the expression for the "parallax" on the reference plane, and the second is the bilinear constraint involving the two image locations of the scene point and the epipole. These are described below.

Parallax on the Reference Plane:

Given the expressions in Equations 1 and 2, it can be easily verified that $$p_{is}-p_{it}=\gamma(p_{is}-p_{ts}), \quad (3)$$

$$\text{where } \gamma = \frac{H_i(H_t - H_s)}{(H_t - H_i)H_s}$$

Note that this expression for parallax (Equation 3) involves only the heights of the scene point and of the camera centers relative to the reference plane Π. It does not include any quantities relative to any of the camera coordinate systems (e.g., the reference frame) such as Z or $T_Z$ as before. Also, the parallax magnitude γ does not depend on the x,y locations of either the camera centers or the scene point. The expression for $$\gamma = \frac{HT_Z}{Zd_\pi}$$

in the P+P case can be related to the current expression as follows: Consider a virtual camera centered at $C_t$, whose image plane is the plane Π, and its optical axis coincides with the H direction. Then $H=H_i$, $Z=H_t-H_i$, $T_Z=H_t-H_s$ and $d_\pi=H_s$.

The parallax expression can be rewritten as, $$\frac{1}{H_iH_s}[H_t(H_i - H_s)p_{is} + H_s(H_t - H_i)p_{it} + H_i(H_s - H_t)p_{ts}] = 0$$

which is a simple cyclically symmetric form.

The Bilinear Constraint:

Equation 3 implies that $p_{it},p_{is}$, and $p_{ts}$ are collinear. Similar to the definition of the epipolar line on the image plane, the line containing these three points on Π is the intersection of the epipolar plane containing $P_i,C_t$, and $C_s$ with Π. Thus, this is the epipolar line as observed on the reference-plane. The collinearity of these three points can be expressed as $p_{it}^T F p_{is}=0$ where $$F = \begin{bmatrix} 0 & 1 & -y_{ts} \\ -1 & 0 & x_{ts} \\ y_{ts} & -x_{ts} & 0 \end{bmatrix}$$

is the "Fundamental Matrix". As opposed to the reference frame based formulation, where the fundamental matrix depends on the camera rotations and the internal calibration parameters of the camera, here it depends only on the epipole. Moreover, the epipole is explicit in the F matrix here, whereas, it is implicit in the conventional formulation.

A description of what happens when the epipole goes to ∞ will now be given. In Equation 2, it can be seen that when $H_s=H_t$, the epipole $p_{ts}$ goes to ∞. In this case, $$p_{ts} = \begin{pmatrix} x_{ts} \\ y_{ts} \\ 0 \end{pmatrix} = \begin{pmatrix} x_t - x_s \\ y_t - y_s \\ 0 \end{pmatrix},$$

and the expression for parallax can be rewritten as:

$$(p_{is} - p_{it}) = \frac{H_i}{(H_t - H_i)H_s} p_{ts}.$$

In other words, all the parallax vectors are parallel to each other (i.e., meet at ∞). One could, of course, unify the finite and the infinite case by using 2D projective notations. However, it is preferred to use 2D Euclidean coordinate representations, in order to emphasize the physical meaning of the various observed and derived quantities. Moreover, the parallax expression in Equation 3, which involves metric relations, is meaningless in a projective coordinate representation.

Also, when $H_t=H_i$ or $H_s=H_i$, then $p_{it}$ or $p_{is}$ go to ∞ respectively. This occurs when, fortuitously, the plane Π is chosen to be parallel to the optic ray from the scene point to one of the cameras. In this case, the corresponding image point cannot be observed on the reference plane, and our analysis does not apply.

Duality on the Reference Plane

In carrying out the present invention, a set of dual relations on the reference-plane is obtained by switching the roles of camera centers and scene points as was previously done in [3, 22].

Figure 3A:
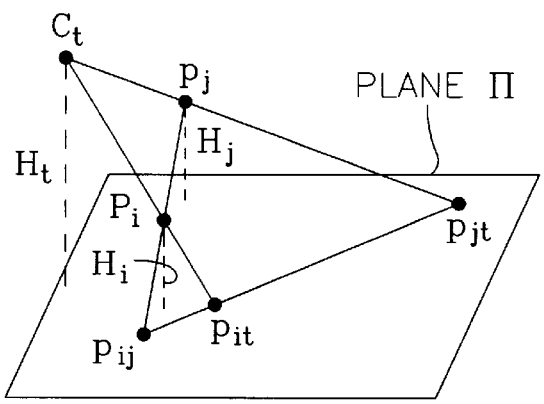
FIG. 3A illustrates the dual-epipolar geometry associated with two points in one view, including a dual epipole and a dual epipolar line intersecting the dual epipole.
Figure 3B:
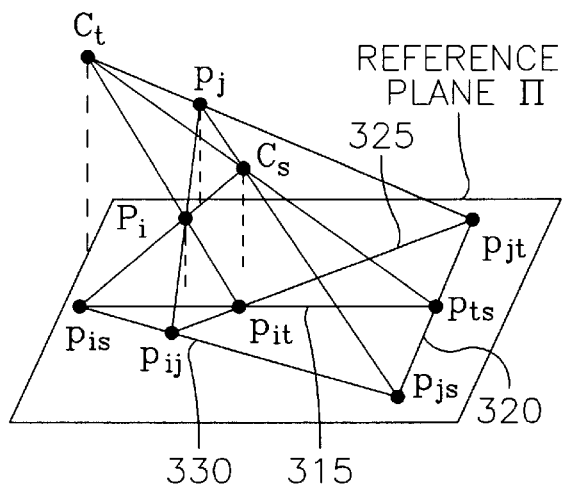
FIG. 3B illustrates two sets of epipolar lines and dual epipolar lines that arise when considering two different views of the same object or scene.

Referring now to FIG. 3A, consider two points $P_i$ and $P_j$ and one camera center $C_t$. Consider the intersection of the rays $P_iP_j$, $P_iC_t$ and $P_jC_t$ with the reference plane Π. These occur respectively at $p_{ij},p_{it}$ and $p_{jt}$. FIG. 3A illustrates the dual-epipolar geometry associated with two points in one view, where $p_{ij}$ is the dual-epipole and the line 310 going through $p_{ij}$ is the dual-epipolar line. FIG. 3B illustrates both sets of epipolar lines (315, 320) and dual-epipolar lines (325, 330) that arise when considering two points in two views. In a manner analogous to the "epipolar plane" (defined by 2 camera centers and a scene point), the plane containing $P_i, P_j$ and $C_t$ (2 scene points and a camera center) is defined as the "dual epipolar plane". By the same analogy, its intersection with Π (i.e., the line connecting $p_{it}, p_{jt}$ and $p_{ij}$) is defined as the "dual epipolar line", and $p_{ij}$ as the "dual epipole". Note that the dual-epipole, the dual-epipolar lines, and the dual-epipolar planes relate to a pair of scene points over multiple views, in the same way the epipole, the epipolar lines, and the epipolar planes relate to multiple scene points over a pair of views.

By applying the duality of scene points and camera centers, the dual of the bilinear constraint and the parallax expressions are derived in algebraic form. They are:

Dual Parallax: $p_{it} - p_{jt} = \gamma_d (p_{it} - p_{ij})$, where $\gamma_d = \dfrac{H_t(H_j - H_i)}{(H_j - H_t)H_i}$, and Dual bilinearity Constraint: $p_{it}^T F_d p_{jt} = 0$, where $$F = \begin{bmatrix} 0 & 1 & -y_{ij} \\ -1 & 0 & x_{ij} \\ y_{ij} & -x_{ij} & 0 \end{bmatrix}$$

is (defined as) the "Dual Fundamental Matrix".

The duality of the bilinear constraint has been previously explored—e.g., Carlsson[3] and Weinshall, et al.[22] derive dual bilinear and trilinear relations in terms of the projective coordinate representations of the scene points, camera centers, and image points. Here, however, these relations are derived in the context of the reference plane images, and provide physical meaning to the dual relations. Also, Irani and Anandan [11] pointed out the dual epipole in the context of the plane+parallax representation. In that case, since the projection on a camera image plane ("reference frame") is included in the formulation, there exists an asymmetry in the various constraints and their dual constraints. In the present invention, complete symmetry is achieved by projecting all the observed quantities onto the reference plane itself.

FIG. 3B completes the picture by considering two points $(P_i, P_j)$ in two views $(C_t, C_s)$. This configuration gives rise to one set of epipolar lines (corresponding to each scene point) going through the epipole $p_{ts}$, and one set of dual-epipolar lines (corresponding to each camera) going through the dual-epipole $p_{ij}$.

Three View Geometry on the Reference Plane

[7] shows that there are no additional independent constraints that can be derived in more than three views. The present invention employs a geometric interpretation of the three-view constraints in terms of physical quantities on the reference plane Π. As will be shown below, the algebraic three-view constraints have a very simple mathematical form, while the tensor-representation of these constraints in the reference-plane has a very simple mathematical form when compared to the tensors in the conventional formulations [17, 9, 7].

Geometric Observations

Figure 4:
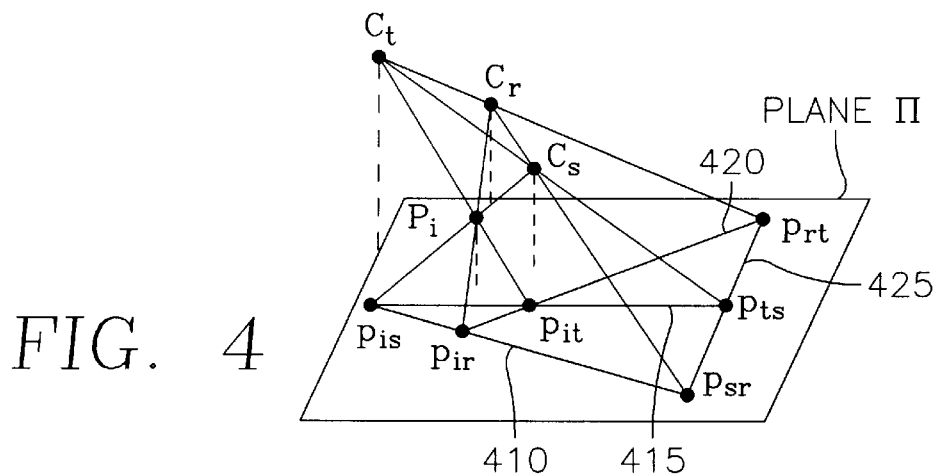
FIG. 4 illustrates the three-dimensional geometry of three views on the reference plane, including three epipolar lines for each pair of views and the focal-line intersecting the three epipoles, the resulting six points lying on the reference plane forming a quadrilateral.

FIG. 4 shows three views $p_{is}, p_{it}$, and $p_{ir}$ of a point $P_i$ as projected onto the reference plane Π. The new camera center is labeled as $C_r$, and the two new epipoles as $p_{rt}$ and $p_{sr}$. Note that geometrically FIG. 4 is identical to FIG. 3B, but the labeling of the point is different. The scene point $P_j$ in FIG. 3B has been replaced by a camera center $C_r$. In fact, this is because of the complete symmetry between scene points and camera centers in our representation.

FIG. 4 illustrates the geometry of three views on the reference plane—a 3D view. The three lines 410, 415, 420 are the epipolar lines of pairs of views, and the line 425 is the focal-line. The 6 points on Π lie on 4 lines forming a "complete quadrilateral".

Taken pairwise at a time, the three views give rise to three epipolar constraints:

$p_{it}, p_{is}, p_{ts}$ are collinear.

$p_{is}, p_{ir}, p_{sr}$ are collinear.

$p_{ir}, p_{it}, p_{rt}$ are collinear.

There is, however, a fourth collinearity constraint, namely:

The epipoles $p_{ts}, p_{sr}, p_{rt}$ are collinear.

This line is simply the intersection of the plane containing the three camera centers $C_t, C_s$ and $C_r$ with Π, as shown in FIG. 4. This plane is referred to as the focal plane. Based on this definition, the line connecting the three epipoles is defined in this specification as the "focal line".

Figure 5:
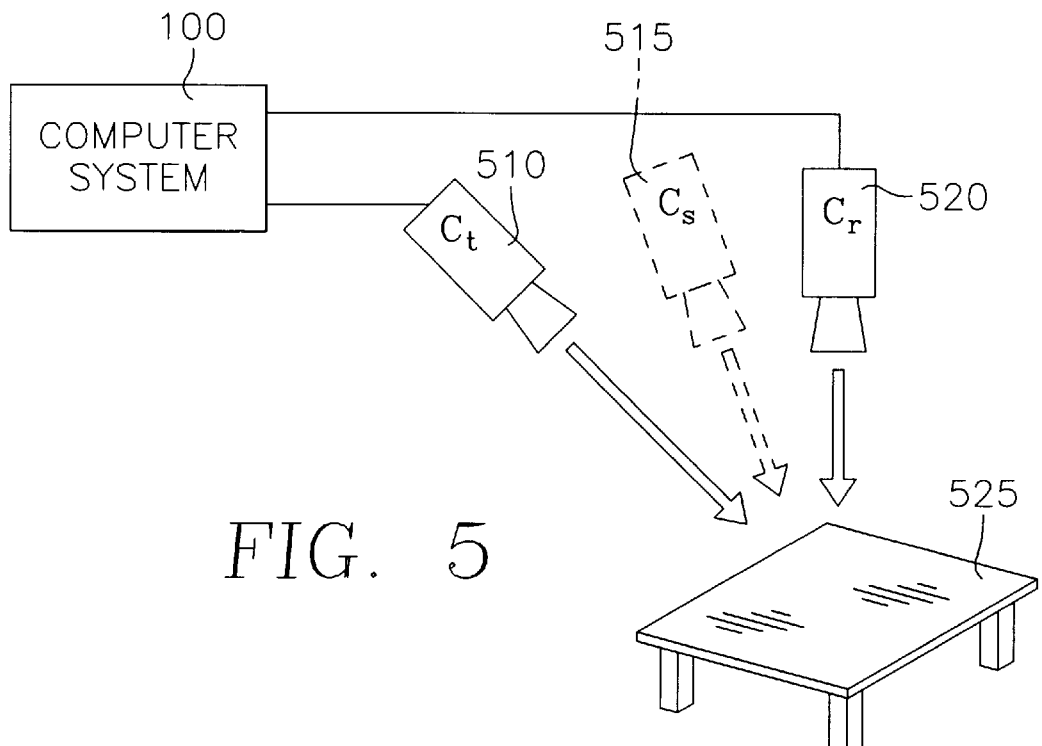
FIG. 5 illustrates three cameras, two real and one virtual, looking down on the reference plane to provide the three views.
Figure 6A:
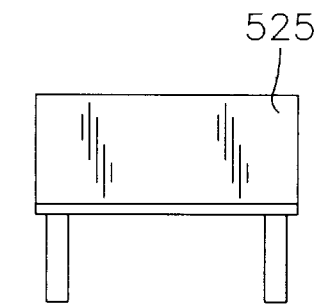
FIGS. 6A, 6B and 6C illustrate the three views of the reference plane obtained, respectively, by the three cameras of FIG. 5.
Figure 6B:
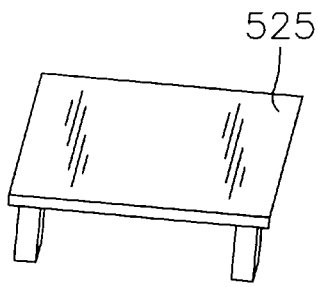
Figure 6C:
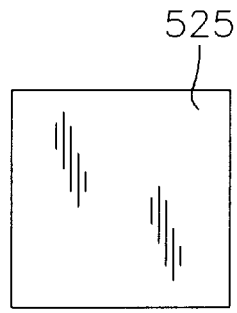

FIG. 5 illustrates the situation of FIG. 4 created by three cameras 510, 515, 520 at camera centers $C_t, C_s$ and $C_r$ respectively viewing the same plane Π which may be a coffee table 525, for example. FIGS. 6A, 6B, 6C illustrate the three perspective views of the coffee table 525 or plane Π as seen by the three respective cameras 510, 515, 520.

Figure 7A:
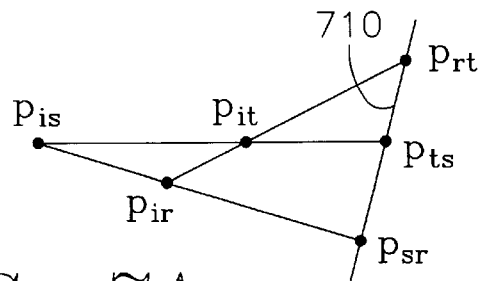
FIG. 7A illustrates the three-dimensional geometry of three views of the reference plane in which a complete quadrilateral is formed by the image of a single point in the three views.
Figure 7B:
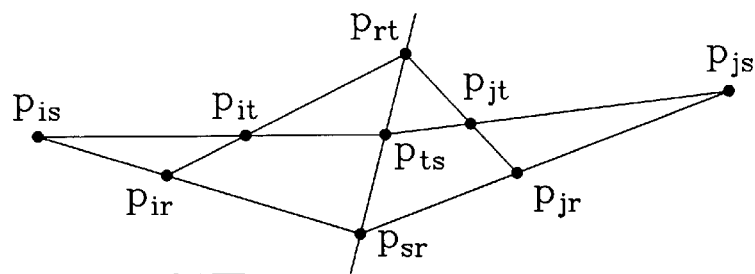
FIG. 7B corresponds to FIG. 7A and illustrates different triangles attributable to different scene points sharing the same focal-line.

The fact that the six points lie on four lines is fundamental to the projection of three views of a point onto a reference plane Π. As illustrated in FIG. 7A, these six points form a "complete quadrilateral" which plays a central role in plane projective geometry [5]. FIG. 7A illustrates the complete quadrilateral formed by the image of a single point in three views and the focal-line 710 containing the three epipoles. FIG. 7B illustrates different triangles due to different scene points sharing the same focal-line.

Given the three cameras, every point in the scene forms a triangle (e.g., with vertices $p_{it}, p_{is}$ and $p_{ir}$. Different points (e.g., indexed i,j, etc.) will form different triangles, all of which share the same focal line, as illustrated in FIG. 7B. In other words, all these triangles are perspective from the focal line. It is known in plane-projective geometry that if two triangles are perspective from a line they are also perspective from a point [5]—this is the converse of the Desargues' Theorem. Given the two triangles corresponding to i and j as in FIG. 7B, then the point of perspectivity is in fact the dual-epipole $p_{ij}$.

The Trifocal Ratio

Each pair of views from the three views provides an expression for parallax similar to Equation 3. For example, consider:

$$p_{is} - p_{it} = \dfrac{H_i(H_t - H_s)}{(H_t - H_i)H_s}(p_{is} - p_{ts}) \quad (4)$$

-continued $$p_{ir} - p_{it} = \frac{H_i(H_t - H_r)}{(H_t - H_i)H_r}(p_{ir} - p_{rt})$$

From these equations we can eliminate $H_i/(H_{t-Ht})$ to obtain:

$$\frac{\|p_{is} - p_{it}\|}{\|p_{is} - p_{ts}\|} = \lambda_{rst}\frac{\|p_{ir} - p_{it}\|}{\|p_{ir} - p_{rt}\|} \quad (5)$$

where $$\lambda_{rst} = \frac{(H_t - H_s)}{H_s}\frac{H_r}{(H_t - H_r)}.$$

The above equation is true up to a sign change. Note that $\lambda_{rst}$ does not depend on the point i. In other words, the locations of the image of each scene point in each of the three views on the reference plane are related by the same Equation 5.

Given two "images" of the point $P_i$ on II, e.g., $p_{is}$ and $p_{ir}$, and the corresponding epipoles, $p_{rt}$ and $p_{ts}$, we can determine the location of the third "image" $p_{it}$ by intersecting the two epipolar lines $p_{is}p_{ts}$ and $p_{ir}p_{rt}$, as shown in FIG. 7A.

Figure 8:
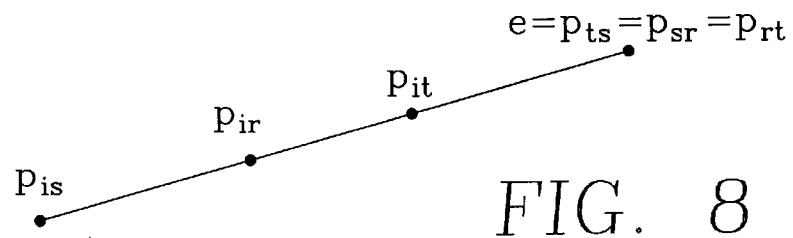
FIG. 8 illustrates one possible situation in which the three-view epipolar lines collapse into a single line.

There are, however, two cases in which the three epipolar lines collapse into a single line (and hence, their intersection is not unique). These are the same situations noted in [7, 17], but in this specification they are examined in the context of the reference-plane images. The first is the case when the three camera centers are collinear, which is illustrated in FIG. 8. In this case the three epipoles collapse into a single point (denoted as e in FIG. 8). The three epipolar lines also collapse into a single line, and therefore $p_{it}$ cannot be determined by the intersection of the epipolar lines. However, given the common epipole e and $\lambda_{rst}$, $p_{it}$ can be recovered from $p_{is}$ and $p_{ir}$ using Equation 5. In fact, in this case, $\lambda_{rst}$ is the cross ratio of these four points (the three image points and the epipole).

Another interesting case is one in which the scene point $P_i$ lies on the "focal plane" of the three cameras. In this case the three image points $p_{it}, p_{is}$ and $p_{ir}$ all lie on the focal line itself. In other words, the three epipolar lines collapse onto the focal line. Hence one cannot use the intersection of epipolar lines to determine $p_{it}$. In this case too, $p_{it}$ can be determined by Equation 5, using $\lambda_{rst}$.

The ratio $\lambda_{rst}$ has a special significance. In considering the focal line, it can be shown (by replacing $P_i$ with $C_r$ in Equation 3) that:

$$p_{sr} - p_{rt} = \lambda_{rst}(p_{sr} - p_{ts}) \quad (6)$$

(Hence, the name "focal-ratio".) In other words, in the general case:

$$\lambda = \frac{\|p_{sr} - p_{rt}\|}{\|p_{sr} - p_{ts}\|} \quad (7)$$

$$= \frac{\|p_{is} - p_{it}\|}{\|p_{is} - p_{ts}\|}\frac{\|p_{ir} - p_{rt}\|}{\|p_{ir} - p_{it}\|}$$

Note that in the singular case, when the epipoles collapse, the ratio of the distances between the epipoles (the top equation) is undefined, but the bottom equation is still valid and can be used.

The Trifocal Tensor

Returning to Equation 5, the component equalities are as follows:

$$\frac{x_{is} - x_{it}}{x_{is} - x_{ts}} = \frac{y_{is} - y_{it}}{y_{is} - y_{ts}} = \lambda_{rst}\frac{x_{ir} - x_{it}}{x_{ir} - x_{rt}} = \lambda_{rst}\frac{y_{ir} - y_{it}}{y_{ir} - y_{rt}} \quad (8)$$

By taking two of these equalities at a time and cross-multiplying by the denominators, six linear constraints are obtained. Of these two are the same as the bilinear (epipolar) constraints involving only two views at a time. The other four, which involve all three views are:

$$(x_{is}-x_{it})(x_{ir}-x_{rt})=\lambda_{rst}(x_{ir}-x_{it})(x_{is}-x_{ts})$$

$$(x_{is}-x_{it})(y_{ir}-y_{rt})=\lambda_{rst}(y_{ir}-y_{it})(x_{is}-x_{ts})$$

$$(y_{is}-y_{it})(x_{ir}-x_{rt})=\lambda_{rst}(x_{ir}-x_{it})(y_{is}-y_{ts})$$

$$(y_{is}-y_{it})(y_{ir}-y_{rt})=\lambda_{rst}(y_{ir}-y_{it})(y_{is}-y_{ts}) \quad (9)$$

Note that these three view constraints are actually only bilinear in the image locations of the scene point (as opposed to the trilinear constraints in [17]). This is because considering the projection of the points on the reference plane itself eliminates the homographies induced between the views (which appear in [18]).

The trilinear forms given in Equation 9 can be unified into a single tensor equation in a manner analogous to [19]:

$$(s^\alpha p_{it})(r^\beta p_{rt}) - \lambda_{rst}(r^\beta p_{it})(s^\alpha p_{ts})=0 \quad (10)$$

where $$s = \begin{bmatrix} -1 & 0 & x_{is} \\ 0 & -1 & y_{is} \end{bmatrix}, \quad r = \begin{bmatrix} -1 & 0 & x_{ir} \\ 0 & -1 & y_{ir} \end{bmatrix}$$

and $\alpha,\beta=1,2$ indicate the row indices of s and r (e.g., $s^1=[-1\ 0\ x_{is}]$).

As in [19], $s^1$ is the vertical line on II passing through $p_{is}$ and $s^2$ is the horizontal line on II passing through $p_{is}$. Similarly $r^1$ and $r^2$ are the vertical and horizontal lines on II passing through $p_{ir}$. Also, as in [19] the relationships in Equation 10 are valid for any line passing through $p_{is}$ and any other line passing through $p_{ir}$. In other words, Equation 10 captures the same point-line-line relationship described in [19] and [7].

Based on further algebraic manipulation, Equation 10 can be rewritten as:

$$\forall \alpha, \beta = 1, 2$$

$$0 = \sum_{a=1}^{3}\sum_{b=1}^{3}\sum_{c=1}^{3}(p_{it})_a(r^\beta)_b(s^\alpha)_c((p_{rt})_b\delta_{ac} - \lambda_{rst}(p_{ts})_c\delta_{ab})) \quad (11)$$

$$= \sum_{a=1}^{3}\sum_{b=1}^{3}\sum_{c=1}^{3}(p_{it})_a(r^\beta)_b(s^\alpha)_c(T^{rst})_{abc}$$

where $\delta$ follows the standard definition: $\delta_{pq}=1$ if p=q and 0 otherwise.

$T^{rst}$ is 3×3×3 tensor $$(T^{rst})_{abc}=((p_{rt})_b\delta_{ac}-\lambda_{rst}(p_{ts})_c\delta_{ab})$$

In the above equations, $(p_{it})_1, (p_{it})_2, (p_{it})_3$, etc. denote the first (i.e., x), the second (i.e., y), and the third (i.e, 1) components of $p_{it}$, etc. Similarly $(T^{rst})_{abc}$ denotes the entry indexed by a,b,c in the Tensor.

The elements of $T^{rst}$ depend on the two epipoles $p_{rt}$ and $p_{ts}$ and $\lambda_{rst}$. This is in contrast to the general form of the trifocal tensor—for example, the trilinear tensor in [17] also depends on the homographies due to the plane Π between the different cameras and the tensor described in [7] which depends on the camera projection matrices. As in the case of the Fundamental Matrix F in our formulation, the epipoles are explicit within the Tensor T, whereas in the general formulation, the tensor is implicitly related to the epipole. Given the Tensor $T^{rst}$, the two epipoles $p_{rt}$ and $p_{ts}$ and the focal-ratio $\lambda_{rst}$ can be recovered (computed); using Equation 6, the third epipole $p_{sr}$ can be recovered (computed).

Duals of the Three View Constraints

Figure 9A:
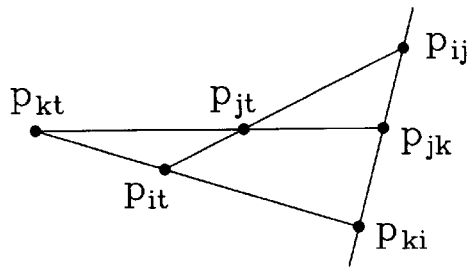
FIG. 9A illustrates one dual to the three view geometry, in which a complete quadrilateral is formed by three scene points and one camera center.

3 Scene Points+1 Camera:

As in the case of two-view analysis, the duality between scene points and camera centers also applies to three-view analysis. By switching the roles of scene points and camera centers in FIG. 4 (i.e., $P_i \to C_i, C_t \to P_t, C_s \to P_j, C_r \to P_k$), new constraints can be derived involving one camera center and three points. The resulting geometric configuration is also a complete quadrilateral, but with a different labeling of the points. FIG. 9A indicates the labeling corresponding to one view of three points. In this case the dual-focal-line contains the dual-epipoles $p_{ij}, p_{jk}$, and $p_{ki}$. The three-view constraint given in Equation 5 is replaced by $$\frac{\|p_{jt} = p_{it}\|}{\|p_{jt} - p_{ij}\|} = \lambda_{ijk} \frac{\|p_{kt} = p_{it}\|}{\|p_{kt} - p_{ki}\|} \quad (12)$$

where $$\lambda_{ijk} = \frac{(H_j - H_i)}{H_j} \frac{H_k}{(H_k - H_i)},$$

is the dual to the focal-ratio $\lambda_{rst}$. Dual to the other forms of the three-view constraints, (e.g., Equation 9) can also be obtained by the same substitution of indices (i.e. $i \to t, t \to i, s \to j, r \to k$), leading to the dual-tensor form:

$$(T^{ijk})_{abc} = ((p_{ki})_b \delta_{ac} - \lambda_{ijk}(p_{ij})_c \delta_{ab}))$$

and the corresponding constraint set:

$\forall \alpha, \beta = 1, 2$ $$0 = \sum_{a=1}^{3} \sum_{b=1}^{3} \sum_{c=1}^{3} (p_{it})_a (r^\beta)_b (f^\alpha)_c (T^{ijk})_{abc} \quad (13)$$

where the definitions of the 2×3 matrices k and s are analogous to the definitions of r and s given earlier. Note that the the three-view constraints and their dual, the three-point constraints are completely symmetric. The dual-tensor depends on the dual-epipoles and the dual to the focal-ratio.

Figure 9B:
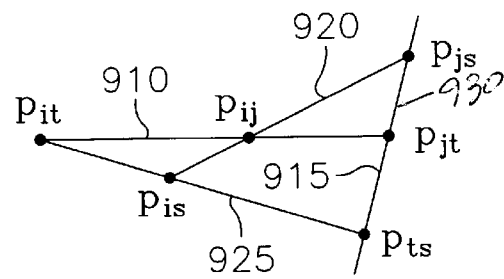
FIG. 9B illustrates another dual to the three view geometery, in which a complete quadrilateral is formed by two scene points and two camera centers, in which the epipolar lines intersect at an epipole, the dual-epipolar lines intersect at a dual epipole, and an epipolar line intersects a dual-epipolar line at an image point.

FIGS. 9A and 9B illustrate duals to the Three View Geometry. FIG. 9A illustrates the complete quadrilateral formed by 3 points+1 camera center. FIG. 9B illustrates the complete quadrilateral formed by 2 points+2 cameras. Note that the epipolar-lines 910, 915 intersect at an epipole, the dual-epipolar lines 920, 925 intersect at a dual-epipole.

Other Combinations of 3+1 Points:

The complete symmetry between scene points and camera centers implies that we can arbitrarily choose the label (either as a scene point or as a camera center) for each of the four 3D points in FIG. 4. So far, two choices have been considered in this specification: 3 camera centers+1 scene point, and 3 scene points+1 camera center. The basic structure is that four points are divided into a group of 3 and a single point. Other duals can be obtained by choosing four points to consisting of 2 camera centers+2 scene points and grouping them as 2 camera centers and a scene point+1 scene point or as 2 scene points and a camera center+1 camera center.

FIG. 9B shows the resulting quadrilateral corresponding to the first of these groupings. Since the configuration shown in FIG. 9B is based on 2 camera centers and 2 scene points, the six points on the quadrilateral consist of four image points, one epipole, and one dual-epipole. Note that the two epipolar lines intersect at an epipole, the two dual-epipolar lines intersect at a dual-epipole, and each epipolar line intersects each dual-epipolar line at an image point.

Unlike the 3D world where there are two types of points (i.e., camera centers and scene points), on the reference-plane there are three-types of points: epipoles, dual-epipoles, and image points. Each of these forms the center of a radial field of lines that go through that point, all three have completely dual-roles on Π.

Applications

The simple and intuitive expressions derived in the reference-plane based formulation in this specification lead to useful applications in 3D scene analysis. In particular, the simpler (bilinear) tri-focal constraints with the identified tri-focal ratio lead to a simple method for New View Synthesis. Moreover, the separation and compact packing of the unknown camera calibration and orientation into the 2D projection transformation (a homography) that relates the image plane to the reference plane, leads to potentially powerful reconstruction and calibration algorithms.

New View Generation Using the Three-View Constraints

The reference-plane based formulation of the present invention provides a simple and intuitive way to generate new views from a given set of views. To work directly with quantities on the reference plane Π would require partial calibration information about the input views. But as explained below, new view synthesis is possible even without such information.

Overview of the New View Synthesis Process:

Step I: One of the two input images (camera "s") is first warped towards the other input image (camera "t", the reference image) via a 2D projective transformation to align the images of the plane Π in the two input image s and t. (Π is the plane of the rug, in our case). The corresponding 2D projective transformation is computed automatically, without any prior or additional information, using a 2D registration technique described in [12]. This method locks onto a dominant 2D parametric transformation between a pair of images, even in the presence of moving objects or other outliers (such as the toys, in our case). For more details see [12].

After such 2D warping, the two plane-stabilized images are in full alignment in all image regions which correspond to the rug, and are misaligned in all other (i.e., out-of-plane) image points (i.e., the toys). The farther a scene point is from the planar surface (rug), the larger its residual misalignment. These misalingments are referred to as planar-parallax displacements (see [13, 14, 11]).

The plane-stabilized sequence is in fact a 2D re-projection of the corresponding "virtual images" on the reference plane Π onto the reference frame as illustrated in FIG. 2B. Therefore, a "quadrilateral" on Π will project to a "quadrilateral" on the reference freame; different triangles on Π corresponding to different scene points and sharing a common focal line will preserve this relation on the reference frame. It can be shown that for any quadrilateral, there exists some $\lambda'_{rst}$ such that Equation (7) holds. In fact, it can be shown that $$\lambda'_{rst} = \frac{T_Z^{ts}}{H_s} \frac{H_r}{T_Z^{tr}}, \quad (14)$$

where $T_Z^{ts}$ is the component of the translation between cameras t and s along the optical (Z) axis of the reference camera t. Similarly $T_Z^{tr}$ for the third camera r. $H_s$ and $H_r$ are as before (i.e., heights relative to II). Therefore, it is preferred in the invention to work with a quadrilateral on the reference frame rather than on the reference plane, and to choose the reference frame to be one of the supplied actual images, for the sake of convenience and economy of computational steps.

Step II: Dense flow is estimated between the two plane-stabilized images. Note that after plane stabilization, the flow field between the two images reduces to a radial epipolar field centered at the epipole (see Equation (3). This step is, basically, a computation of the parallax vectors between the two images, and is carried out in accordance with techniques described, for example, in [13, 14]). The cancellation of the plane homography removes all effects of camera rotation and changes in calibration. This allows to compute the flow field between a plane-stabilized image pair more reliably than general flow, as it is constrained to satisfy a global epipolar constraint.

Step III: The epipole ($p_{ts}$) is estimated from the radial flow field between the two input plane-stabilized images. The user then specifies: (i) the virtual epipole (e.g., $p_{rt}$) between the reference image and the virtual "plane-stabilized" image, (ii) a virtual tri-focal ratio $\lambda'_{rst}$ in the reference frame. Given the virtual tri-focal ratio $\lambda'_{rst}$) the virtual epipole $p_{rt}$, the actual epipole $p_{ts}$, and the dense flow field between the two plane-stabilized images (between $p_{it}$'s and corresponding $p_{is}$'s), we can estimate all image points in the virtual (plane-stabilized) image (namely, all $p_{ir}$'s) using Equation 8.

The virtual tri-focal ratio $\lambda'_{rst}$ and the virtual epipole $p_{rt}$ can either be specified directly (e.g., via Equation (14)), or else by specifying the location of two or more image points in the virtual (plane-stabilized) view, and estimate them accordingly.

Figure 10:
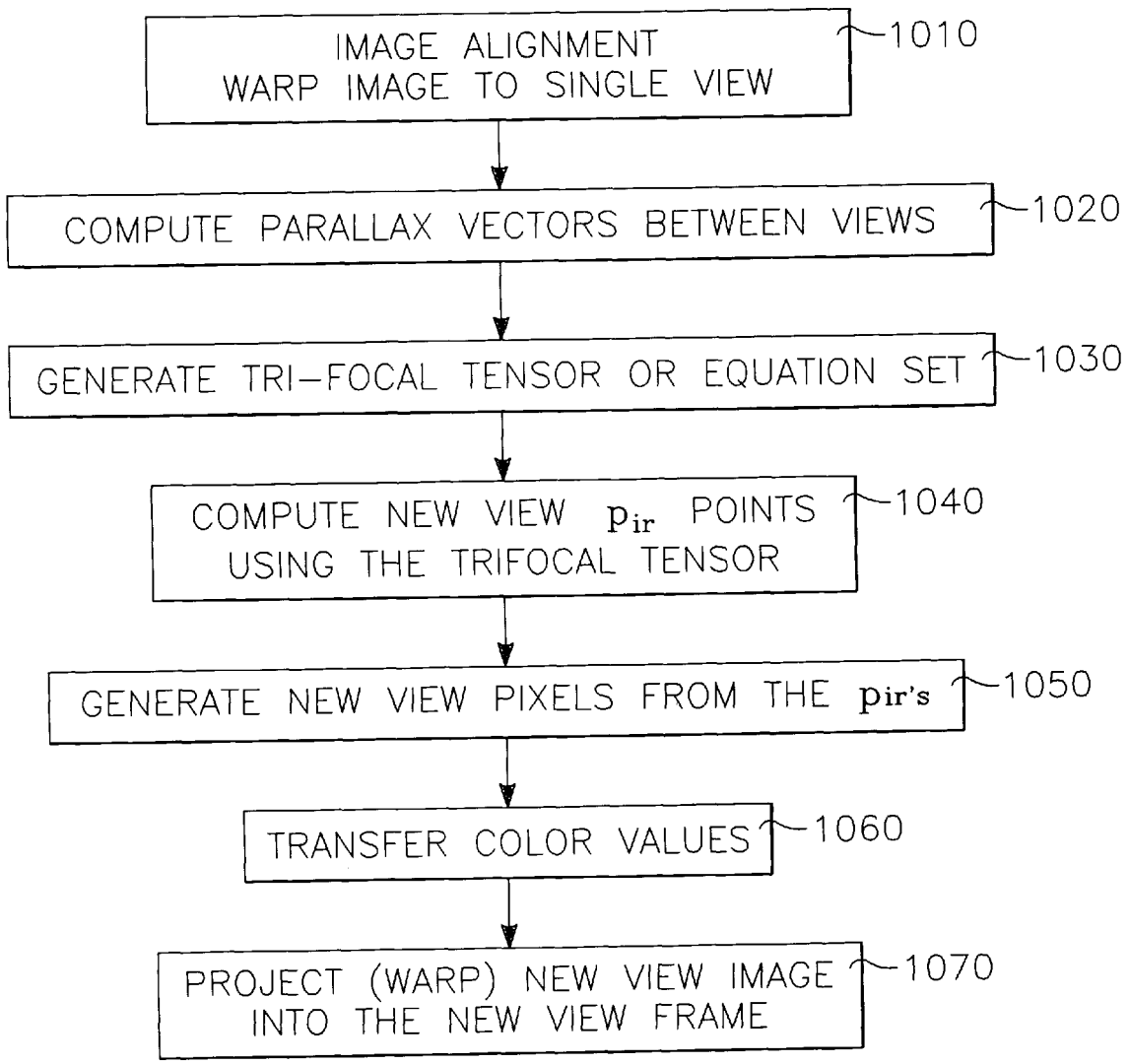
FIG. 10 is a block flow diagram illustrating a method for applying the invention to new view synthesis.

Step IV: The synthesized plane-stabilized image is the same for any camera centered at $C_r$. In other words, it is independent of the internal parameters and the orientation of that camera. By specifying a homography that relates the image plane of the virtual camera to the stabilized image from the reference view, we have the complete flexibility to generate an image obtained by any camera situated at $C_r$. This is done by unwarping the synthesized plane-stabilized image via the corresponding 2D projective transformation.
Detailed Description of the New View Synthesis Process:

Referring now to FIG. 10, the first step in the new view synthesis process is to choose a first one of the two actual images as the reference frame and to warp the other (the second) actual image so as to align it with the one image (block 1010 of FIG. 10). This is done by choosing a flat surface visible in both views of the scene, such as a coffee table top, and designating it as the reference plane. The second image is warped by a homography that renders the perspective shape of the reference plane (e.g., the coffee table top) identical in both the first and second images. Techniques well-known to those skilled in the art are adequate for performing this step. Referring to FIG. 5, the cameras at t and s, in the present example, are real cameras and provide the two actual images referred to here, while the camera at r is a virtual camera symbolically representing a point of view which is to be reconstructed from the two actual images.

The next step is to compute parallax vectors between the views, using the published techniques referred to above (block 1020 of FIG. 10). Such a parallax vector is the line between the projection of the same scene point on the reference plane in different images of the reference plane. For example, referring to FIG. 3B, the line connecting $p_{it}$ and $p_{is}$ and the line connecting $p_{jt}$ and $p_{js}$ are parallax vectors computed in this step. Their intersection on the reference plane defines the location of the epipole $p_{ts}$.

Figure 11:
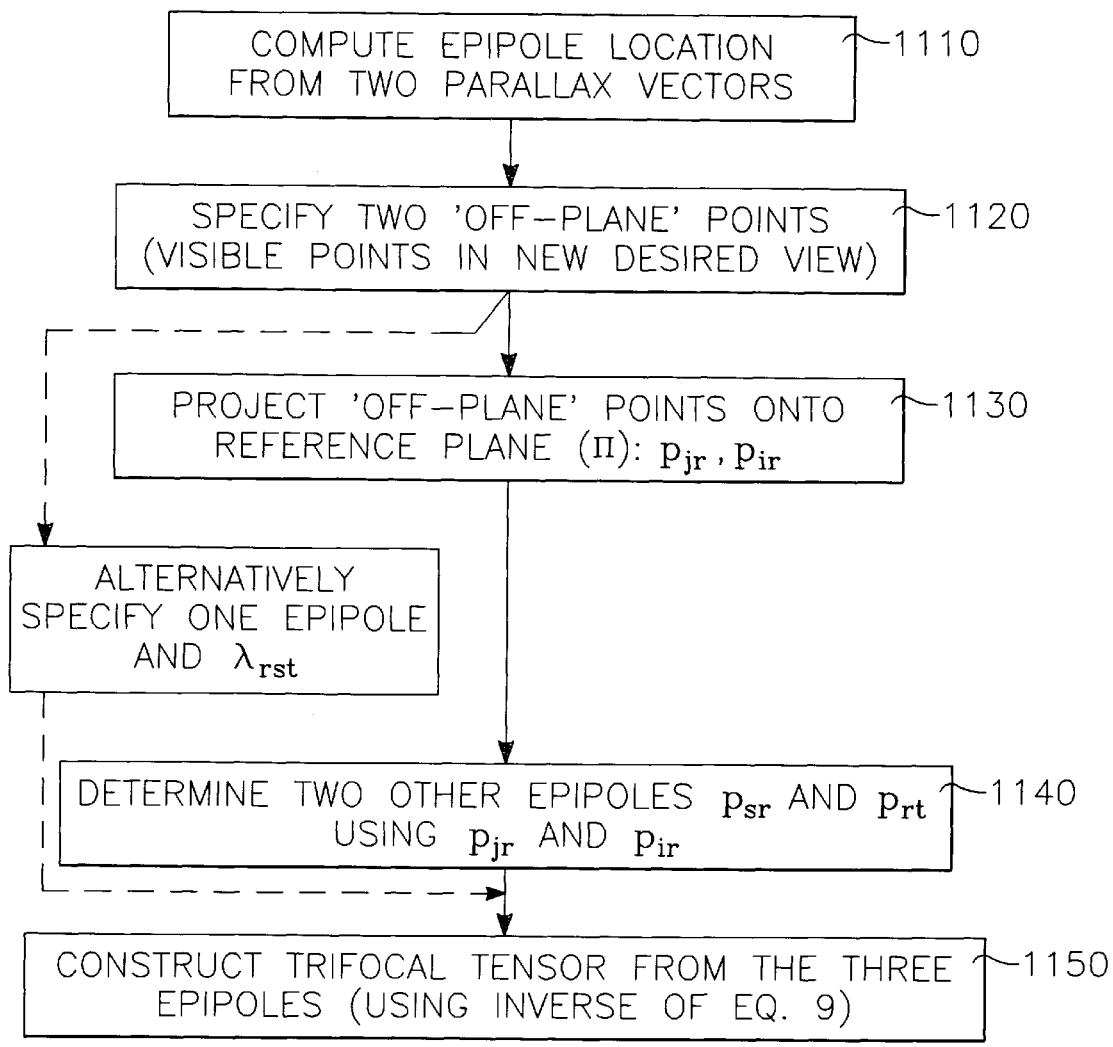
FIG. 11 is a block flow diagram illustrating in detail the sub-steps involved in one of the steps in the method of FIG. 10 in which the tri-focal tensor is constructed.
Figure 12:
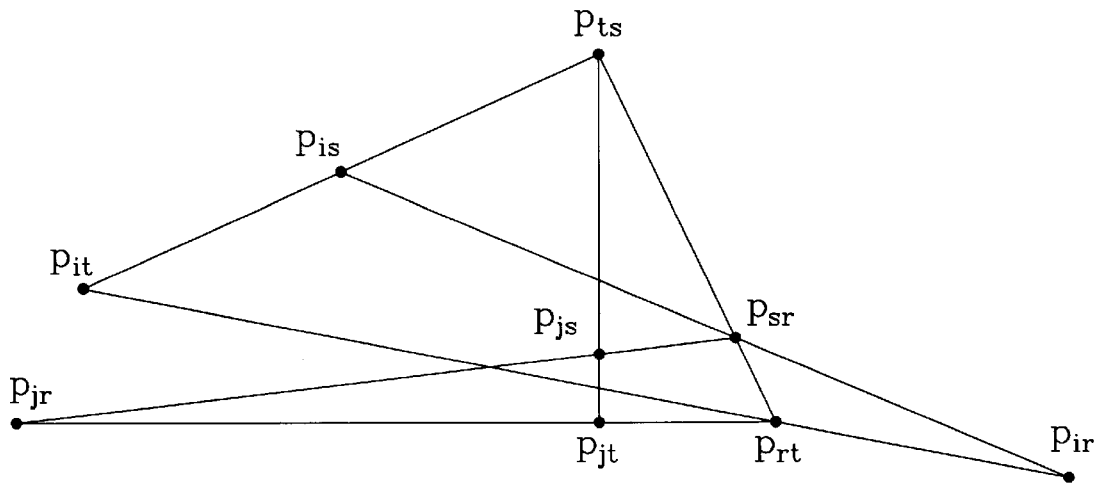
FIG. 12 illustrates the 3-dimensional geometry realized in one of the steps of the method of FIG. 11 in which the tri-focal tensor constraints obtained by projecting a pair of off-plane points onto the reference plane.

The next step is to produce the trifocal tensor of Equation 11 or (more preferably) produce the trifocal system of equations of Equation 9 (block 1030 of FIG. 10). There are a number of alternatives for performing this operation. FIG. 11 illustrates the steps in accordance with one of these alternatives employed in carrying the operation of block 1030. Referring to FIG. 11, a first step is to employ conventional techniques to compute the location of the epipole $p_{ts}$ as the intersection of the extensions of the parallax vector or line connecting $p_{it}$ and $p_{is}$ and the line connecting $p_{jt}$ and $p_{js}$ on the reference plane (block 1110 of FIG. 11). The next step is for the user to specify the characteristics of the new view to be synthesized. One way to do this is to specify the projection on the reference plane of the two scene points $p_i$ and $p_j$ (which are not on the reference plane) as viewed from the perspective of the new view camera center, namely the projection points $p_{ir}$ and $p_{jr}$. Thus, the user can specify the two points (i and j) (block 1120 of FIG. 11) and specify their projection onto the reference plane from the perspective of the new scene camera center (block 1130 of FIG. 11). This creates the quadrilateral geometry on the reference plane illustrated in FIG. 7B. Another version of this geometry (corresponding to a different arrangement of scene points) is illustrated in FIG. 12. What this step does is to precisely locate each one of the three epipoles $p_{rt}, p_{ts}, p_{sr}$ at respective intersections of corresponding pairs of parallax vectors, as described previously in this specification. This geometry defines the parameters of Equation 5 from which the trifocal system of equations (Equation 9) is readily produced. For example, the term $\lambda_{rst}$ is now readily computed from this geometry, and the two new ("virtual") epipoles $p_{sr}, p_{rt}$ are readily located as illustrated in FIG. 7B (block 1140 of FIG. 11). Conventional geometric computation techniques may be employed to accomplish the foregoing. Alternatively, the user may simply specify the location of one of the virtual epipoles and the value of $\lambda_{rst}$. From these quantities, the trifocal system of equations of Equation 9 are readily constructed, as defined above, using conventional algebraic computation techniques (block 1150 of FIG. 11).

Referrring again to FIG. 10, the next step in the process of FIG. 10 is to use the trifocal tensor or, equivalently, the trifocal system of equations of Equation 9, to compute the locations in the new (synthesized) view of all the points observed in the two actual images (block 1040 of FIG. 10). Referring to the system of equations of Equation 9, for each point observed in the two actual images (i.e., the known quantities $x_{is}, y_{is}, x_{it}, y_{it}$ in the system of equations of Equation 9), a corresponding location (i.e., the unknowns $x_{ir}, y_{ir}$ in the system of equations of Equation 9) is computed by solving the system of equations, using conventional algebraic techniques. For each of these points, a pixel value is determined from the corresponding pixels in the two actual images using conventional techniques (block 1050 of FIG. 10). For example, where the point in question is visible in both of the actual images, the corresponding pixel value in the new view could be determined by computing an average of the corresponding pixel values in the two actual images. Of course, in some instances, the point in question may be visible in only one of the actual images, in which case the pixel value cannot be predicted and should be left "blank" or set to a default value (such as zero). In some instances, certain pixel locations in the new view may not be visible in any of the actual images, in which case the missing pixel cannot be predicted and should be left blank. Thereafter, the color values from corresponding pixels in the actual images are transferred to the corresponding new view pixels (block 1060 of FIG. 10).

The new view image thus created has been computed as if warped to the reference frame. It will be recalled that the parallax vectors forming the basis of the foregoing computations were computed by warping one of the actual images to the actual image chosen as the reference frame, and therefore the result obtained need to be "un-warped" to the new view perspective. Therefore, the new view image computed upon completion of the step of block 1060 must be transformed ("unwarped") in accordance with a homography that transforms between the reference frame and the perspective of the new view camera (block 1070 of FIG. 10). Such a transformation can be computed or specified in any suitable fashion. One way would be to specify the actual location of the new view camera center, the internal calibration parameters of that camera (e.g., focal length, aspect ratio, etc.), and the orientation of the image plane of the camera (e.g., by specifying the direction of the optical axis of the camera). Then explicitly compute the warp transformation between the new view camera center and the reference frame. Another (easier) way is to pick a plane (e.g., the reference plane) visible in the actual image and specify its appearance in the new view (i.e., specify the warp of the chosen plane between the reference frame and the new view perspective). Either definition of the transformation permits the warp transformation to be computed readily by conventional techniques.

Figure 13:
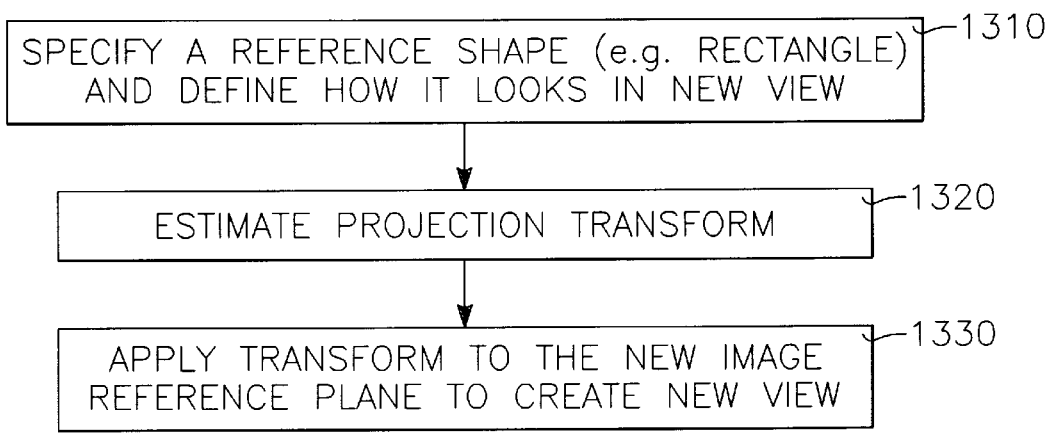
FIG. 13 is a block flow diagram illustrating in detail certain sub-steps involved in a final step in the method of FIG. 12 in which the new view in the reference frame is transformed to the perspective of the new view location frame.

The latter technique is illustrated in FIG. 13. The first step is to specify a reference shape of a planar surface visible in the image such as a rectangle or other quadrangle (block 1310 of FIG. 13). The next step is to estimate a projection transform that defines how that shape is warped between the reference frame and the new view (block 1320 of FIG. 13). The estimated projection transform is then applied to the new view image computed by the completion of the step of block 1060 (block 1330 of FIG. 13).

Figure 14:
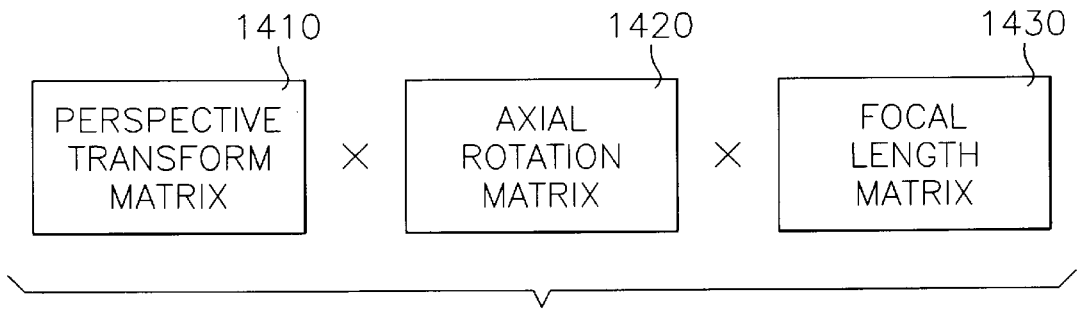
FIG. 14 illustrates key elements of the transform employed in the sub-steps of FIG. 13.

FIG. 14 illustrates the components of the complete transform for the new view image, including the projection transform 1410. The projection transform 1410 accounts for camera orientation. In addition, an axial rotation matrix 1420 may be included to account for axial camera rotation. Also, a conventional focal length matrix 1430 is preferably included to account for the new view camera focal length. Each of the elements 1410, 1420, 1430 of the transform is readily computed in accordance with conventional techniques.

Figure 15A:
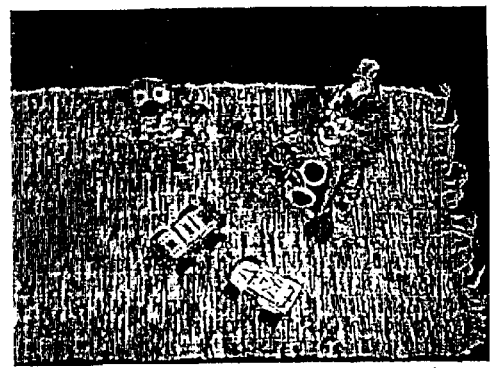
FIGS. 15A and 15B are two actual images of the same scene taken from different perspectives by a hand-held camera.
Figure 15B:
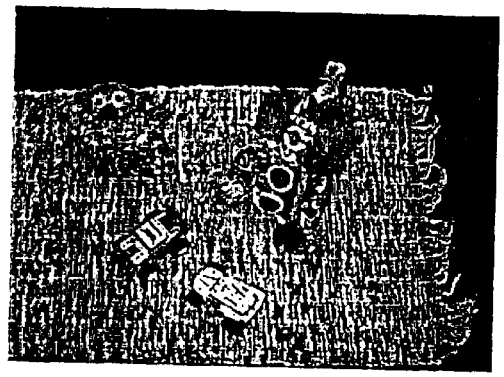

Working Example:

FIGS. 15A–15D illustrate actual results of one application of the new view synthesis or generation process described above. FIGS. 15A and 15B are two images taken by a hand-held camera. The scene contained toys which were placed on a rug on the floor. The camera translated and rotated between the two views. The 3D parallax effects due to the camera translation are apparent in the change of the 2D distance (on the image) between the clown's hat and the upper-right corner of the rug.

Figure 15C:
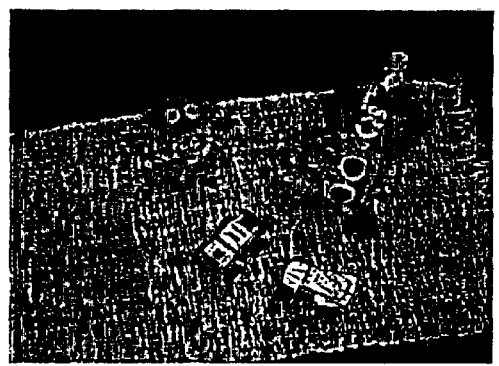
Figure 15D:
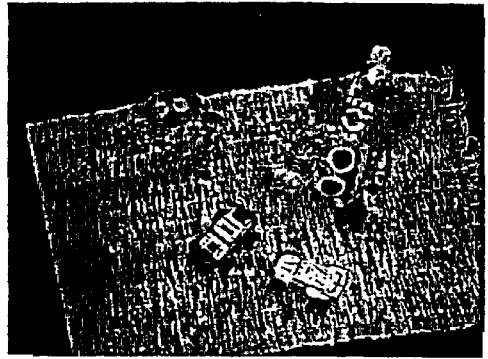
FIG. 15D is an actual view of the same scene taken from the third perspective for the sake of comparison.

FIG. 15C is a new synthesized view of the scene, as if obtained from a virtual camera positioned farther to the left of the scene relative to the two original views (and rotated, to compensate for the translation). Note the smaller distance between the clown's hat and the corner of the rug. For comparison and verification, FIG. 15D shows an actual view obtained from the same viewing direction and orientation. Also, note the differences between the actual and synthesized view. There are image distortions where the flow was inaccurate (at depth discontinuities, e.g., on the rug around the clowns head, and near the ears of the smaller doll). Also, the synthesized view is missing the left part of the rug, as this portion of the rug was not viewed in any of the 2 input images.

The two images of FIGS. 15A and 15B were taken by a hand-held camera. The camera translated and rotated between the two views. The 3D parallax effects due to the camera translation are apparent by the change in the 2D distance (on the image) between the clown's hat and the upper-right corner of the rug. The new synthesized view of the scene of FIG. 15C shows the smaller distance between the clown's hat and the corner of the rug, which may be compared with the actual view of FIG. 15D obtained from the same viewing direction and orientation. Note the differences between the actual and synthesized view: There are image distortions where the flow was inaccurate (e.g., on the rug around the clown's head, and near the ears of the smaller doll). Also, the synthesized view is missing the left part of the rug, as this portion of the rug was not viewed in any of the 2 input images, (a and b).

Alternative Modes for Generating the Tri-Focal Tensor:

A solvable form of the tri-focal system of equations is specified completely upon definition of the six-point geometry of FIG. 7B. In the foregoing description of FIG. 10 and 11, this was achieved by the use of actual images from two camera views (t and s) and the specification of the reference plane projection from the new view (camera center r) of two off-plane points (i and j) to solve for the point locations in the new view for each of the known points observed by the two cameras. However, this is not the only way of constructing the tri-focal tensor. The tri-focal tensor is a data structure specifying the tri-focal simultaneous linear constraints of Equation 9, and this data structure can be generated by other methods. As discussed above, the six-point geometry of FIG. 7B can be realized by the following methods:

(1) Obtain the two views at t and s and specify the image locations of two off-plane points i and j;

(2) specify the 3-dimensional location of the new view camera center;

(3) specify the epipole and the trifocal ratio $\lambda_{rst}$. In the following discussion, method (1) only is mentioned, it being understood that either method (2) or (3) may be substituted in its place.

The tri-focal tensor or system of equations may be found by defining the required complete quadrangle either on the reference plane or on the reference frame, the latter choice being preferred. In fact, in the following discussion, since it does not matter which of the two alternatives is chosen except for computational cost, any mention of reference plane below may be replaced by a "reference frame" to be as general as possible. The complete quadrangle geometry of FIG. 7A used in deriving the tri-focal tensor equations can be defined in accordance with following modes described above:

mode (1): three camera centers and one scene point (FIG. 4);

mode (2): three scene points and one camera center (FIG. 7A);

mode (3): two camera centers and two scene points.

As discussed above, the tri-focal equations (Equation 9), to be solvable, require specification by the user of further information in order to uniquely locate the six points on the reference plane (or on the reference frame) corresponding to the parameters listed immediately above. For example, in the case of mode (1), the requirement for additional information to render the tri-focal equations solvable is met by specifying, from the point of view of the new view (r), the projection on the reference plane of two off-plane scene points. In the most general sense, the complete quadrilateral (e.g., of FIG. 7A, 9A or 9B) is formed using prior knowledge of a combination of camera center(s) and scene point(s) (e.g., as embodied by the information contained in images taken from different camera centers). Then, additional information is specified to locate the six points of the quadrilateral and thereby render the tri-focal equations solvable (e.g., the projection of the additional off-plane point from the new view perspective). Then, the tri-focal system of equations (Equation 9) is solved for whatever remaining quantity is unknown (e.g., the scene point locations in the new view). The unknown quantity may, however, be any one of the other terms in the tri-focal equations (Equation 9) provided the remaining quantities are specified. Thus, the unknown may be an epipole location or the projection on the reference plane of a scene point as viewed from a specified location or camera center.

In the case of mode (1) (in which the complete quadrangle corresponds to three camera centers and one scene point), one of the three camera centers corresponds to a new view to be constructed via the tri-focal tensor equations from actual images taken from the other two camera centers. The additional required information can take the form of a specification of how the projection on the reference plane of the one scene point and an additional scene point appears in the new view. Alternatively, it may the the 3-D location of the new view camera center, or it may be the specification of one epipole together with the trifocal ratio $\lambda_{rst}$.

In the case of mode (2) (in which the complete quadrangle corresponds to three scene points and one camera center), the one camera center corresponds to the camera from which an actual image of the reference plane projection of the three scene points is obtained. The additional required information can take the form of the specification of the reference plane projection of the three scene points as viewed from another camera center corresponding to the new view to be reconstructed via the tri-focal tensor equations. Thus, in contrast to mode (1) in which an additional scene point is specified, in mode (2) one method is to specify an additional camera as the new view by specifying the reference plane projection from the new view of the three scene points.

In the case of mode (3) (in which the complete quadrangle corresponds to two camera centers and two scene points), one of the two camera centers corresponds to a new view to be constructed, via the tri-focal tensor equations, from an actual image taken from the other camera center. The additional required information can take the form of a specification of how the projection on the reference plane of each of the two given scene points appears in the new view.

Figure 16:
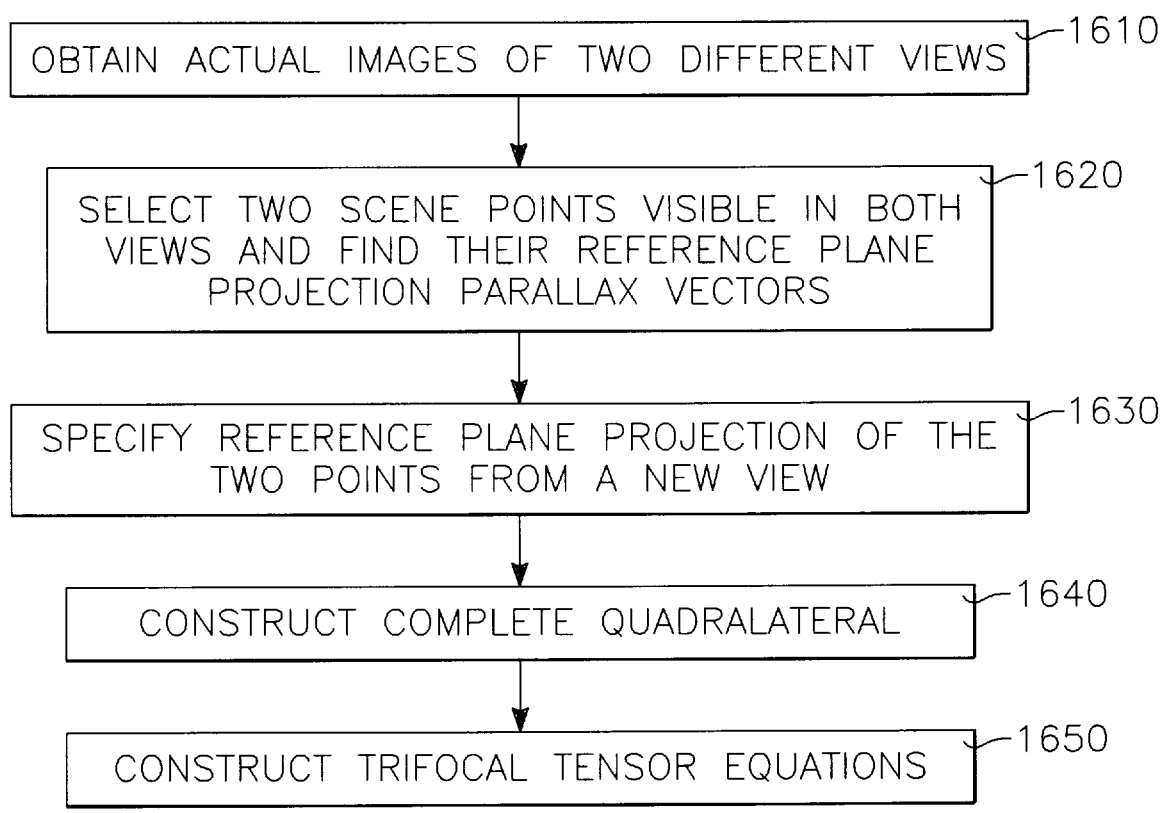
FIG. 16 is a block diagram illustrating one mode of the process of the invention.
Figure 17:
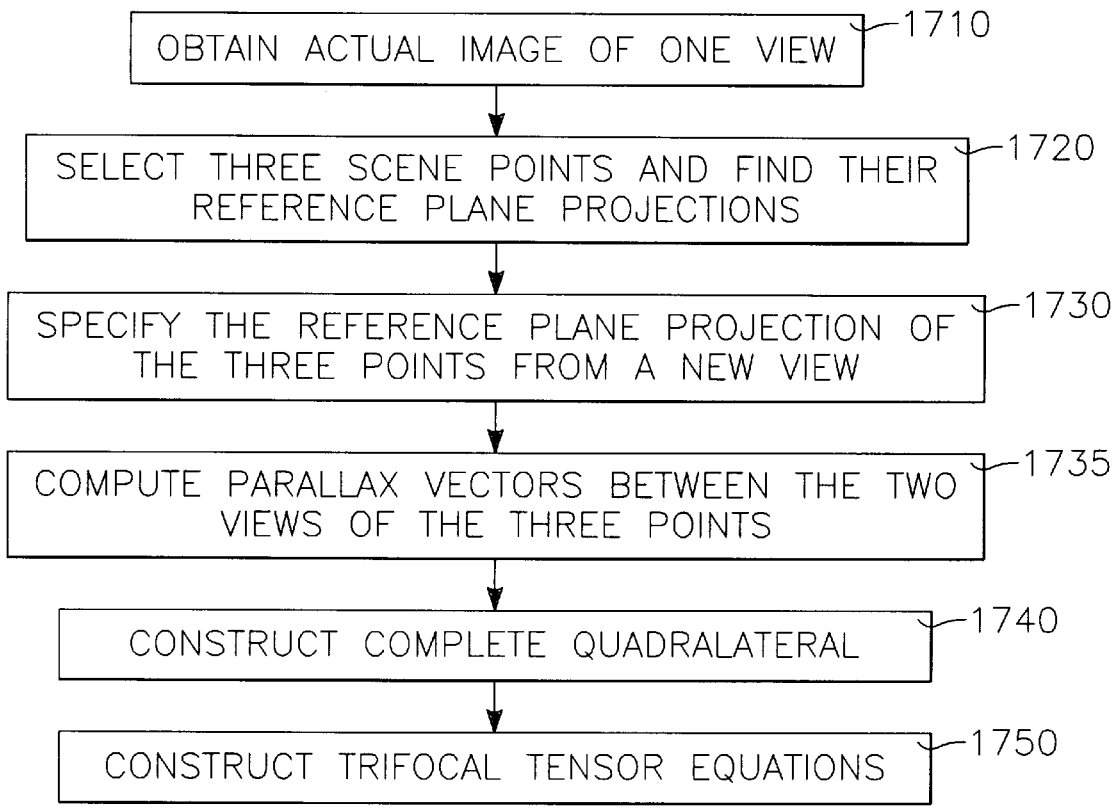
FIG. 17 is a block diagram illustrating an alternative mode of the process of the invention.
Figure 18:
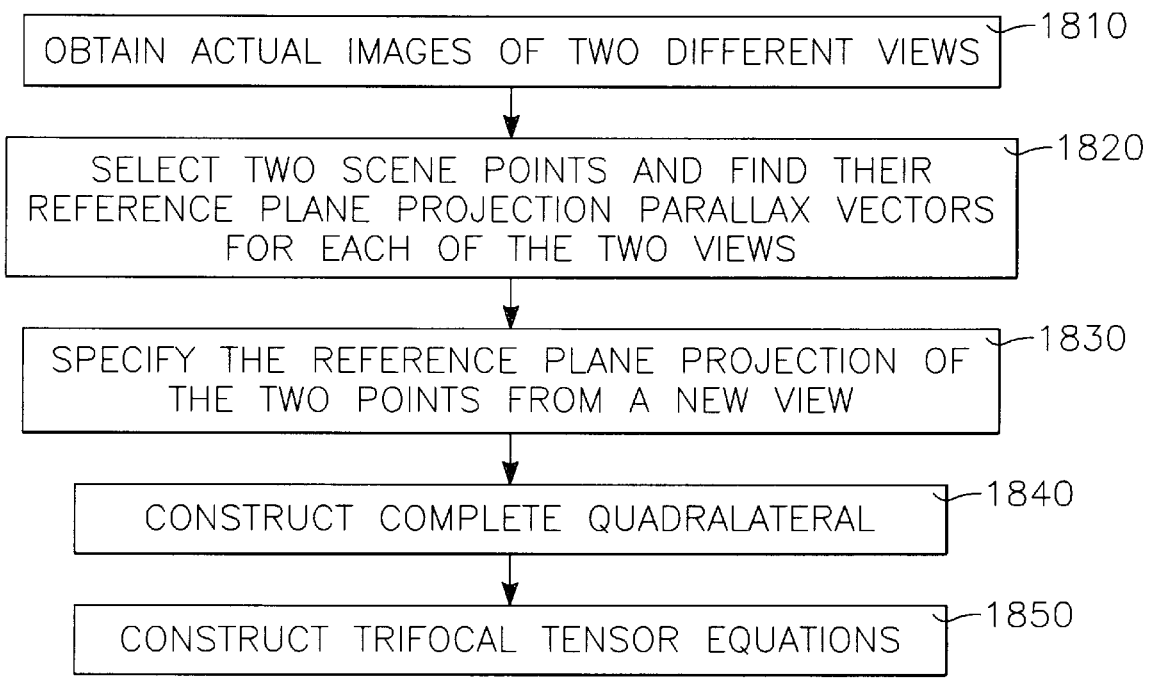
FIG. 18 is a block diagram illustrating another alternative mode of the process of the invention.

Process steps corresponding to the three modes are illustrated in FIGS. 16, 17 and 18, respectively. Referring to the illustration of mode (1) in FIG. 16, two actual images are obtained from two of the three camera centers (block 1610 of FIG. 16) and a projective transform is applied to at least one of them to bring a designated planar surface visible in both images into perspective alignment. Two scene points visible in both actual images are chosen and their reference plane projection parallax vectors are determined (block 1620). Then, the reference plane projection from the third camera center of the two scene points is specified (block 1630). From this, the complete quadrilateral is determined (block 1640) and the tri-focal tensor or tensor-constraint is produced (block 1650).

Referring to the illustration of mode (2) in FIG. 17, an actual image is obtained from the one camera center (block 1710 of FIG. 17). Three scene points in the actual image are chosen and their respective projections onto the reference frame are determined (block 1720). Then, the reference plane projection from a new view camera center of the three scene points is specified (block 1730). The parallax vectors of the three scene points between the two views are then computed (block 1735). From this, the complete quadrilateral is determined (block 1740) and the tri-focal tensor or tensor-constraint is produced (block 1750).

Mode (3) may be considered to be a variation of mode (2) in which the new view camera center is specified. Referring to the illustration of mode (3) in FIG. 18, an actual image is obtained from one of the two camera centers (block 1810 of FIG. 18). The other camera center is the 3-D location of the new view which is to be synthesized. The actual image obtained is transformed in accordance with a projective transformation. This projective transformation is computed using conventional techniques from the new view camera center 3-D location (relative to the actual image camera center) so as to bring a selected planar surface visible in both the actual image and in the new view into perspective alignment. Two scene points visible in both the actual image and in the new view are chosen and their reference frame parallax vectors (i.e., the parallax of the point projections onto the reference frame between the two camera centers) are determined (block 1820) using the knowledge of the new view camera center 3-D location. Then, the reference plane projection of a third scene point is specified (block 1830).

Preferably, the reference plane is the image plane of the one actual image, so that obtaining the reference plane projection of the three points from the point of view of the one actual image is straightforward. The reference plane projection of the three selected points from the point of view of the new image is computed based upon the knowledge of the 3-D location of the new view camera center. The parallax vectors corresponding to the three points are then computed from the foregoing results in a straightforward manner. From this, the complete quadrilateral is determined (block 1840) and the tri-focal tensor or tensor-constraint is produced (block 1850).

In carrying out the invention, the trifocal tensor linear system of equations, namely Equation 5 above, is solved for the unknowns. In the example explored in detail with respect to FIGS. 15A–15D, the unknowns are the $x_{ir}$ and $y_{ir}$ scene points in the new view for each of the actual scene points $x_{is}$ and $y_{is}$, $x_{it}$ and $y_{it}$. The known quantities in the trifocal system of equations, in the example discussed, are the trifocal ratio $\lambda_{rst}$ the epipole components $x_{ts},y_{ts},x_{rs},y_{rs},x_{rt},y_{rt}$ and the actual scene point components $x_{is}$ and $y_{is}$, $x_{it}$ and $y_{it}$. These quantities, when configured into the equation array of Equation 9 or the tensor structure of Equation 11, constitute a data structure amenable to computation of the unknown scene point in the new view for each corresponding scene point in the actual images. Therefore, a set of known quantities corresponding to the trifocal ratio $\lambda_{rst}$, the epipole components $x_{ts},y_{ts},x_{rs},y_{rs},x_{rt},y_{rt}$ and the actual scene point components $x_{is}$ and $y_{is}$, $x_{it}$ and $y_{it}$ in Equation 9 (or the equivalent information in the tensor formulation of Equation 11) are referred to in this specification as the trifocal tensor data structure.

While the invention has been described in detail by specific reference to preferred embodiments, it is understood that variations and modifications thereof may be made without departing from the true spirit and scope of the invention.

What is claimed is:

1. A process for synthesizing a new image representing a new viewpoint of a scene from at least two existing images of the scene taken from different respective viewpoints, comprising:

choosing a planar surface visible in said at least two of said existing images and transforming said at least two existing images relative to one another so as to bring said planar surface into perspective alignment in said at least two existing images;

choosing a reference frame and computing parallax vectors between said two images of the projection of common scene points on said reference frame;

specifying an image parameter on said reference frame of said new viewpoint, and constructing from said image parameter and from said parallax vectors a trifocal tensor data structure;

computing scene points in said new view from the scene points in said existing images using said trifocal tensor data structure, to produce said synthesized new view image; and wherein said image parameter of said new view comprises the information sufficient, together with said parallax vectors, to deduce: (a) a trifocal ratio in the reference frame and (b) one epipole between the new viewpoint and one of said first and second viewpoints.

2. The process of claim 1 wherein said reference frame comprises an image plane of a first one of said existing images.

3. The process of claim 1 wherein said reference frame is co-planar with said planar surface.

4. The process of claim 2 wherein the transforming of said existing images comprises performing a projective transform on a second one of said existing images to bring its image of said planar surface into perspective alignment with the image of said planar surface in said first existing image.

5. The process of claim 1 wherein said image parameter of said new view comprises said trifocal and said one epipole.

6. The process of claim 1 wherein said image parameter of said new view comprises the projection onto said reference frame from said new viewpoint of at least two different scene points visible in said existing images.

7. The process of claim 6 wherein the step of constructing a trifocal tensor data structure comprises:

computing, from said parallax vectors and from said projection of said scene points, three epipoles corresponding to views of each one of said two visible scene points from, respectively, said first viewpoint, said second viewpoint and said new viewpoint.

8. The process of claim 7 wherein the step of constructing a trifocal tensor data structure further comprises:

computing from said three epipoles a trifocal ratio; and computing elements of said trifocal tensor data structure from said trifocal ratio and from said three epipoles.

9. The process of claim 1 wherein said image parameter of said new view comprises information sufficient, together with said parallax vectors, to compute three epipoles on said reference frame corresponding to pairs of said first, second and new viewpoints.

10. The process of claim 9 wherein said image parameter of said new view comprises said three epipoles.

11. The process of claim 10 wherein the step of constructing a trifocal tensor data structure further comprises:

computing from said three epipoles a trifocal ratio; and computing elements of said trifocal tensor data structure from said trifocal ratio and from said three epipoles.

12. The process of claim 9 wherein said image parameter of said new view comprises the projection onto said reference frame from said new viewpoint of at least two different scene points visible in said existing images.

13. The process of claim 12 wherein the step of constructing a trifocal tensor data structure comprises:

computing, from said parallax vectors and from said projection of said scene points, three epipoles corresponding to views of each one of said two visible scene points from, respectively, said first viewpoint, said second viewpoint and said new viewpoint.

14. The process of claim 13 wherein the step of constructing a trifocal tensor data structure further comprises:

computing from said three epipoles a trifocal ratio; and computing elements of said trifocal tensor data structure from said trifocal ratio and from said three epipoles.

15. The process of claim 1 further comprising transforming said synthesized new view image by a projective transform corresponding to a homography between said reference frame and said new viewpoint.

16. A computer-readable medium storing information representing instructions for carrying out the steps of claim 1.

17. A process for synthesizing an image of a scene in accordance with a new viewpoint from a pair of existing images of the scene taken from respective initial viewpoints, comprising:

choosing a planar surface visible in said two existing images and transforming said existing images relative to one another so as to bring said planar surface into perspective alignment in said at least two existing images;

selecting a reference frame and at least two scene points in said existing image, and determining the projection on the reference frame of parallax vectors between the two images of said two scene points;

specifying the new viewpoint by specifying the projection on the reference frame of said two scene points as viewed from the new viewpoint;

computing parallax vectors between said initial viewpoints and said new viewpoint of said projections of said two scene points;

computing from said parallax vectors of said three scene points a trifocal tensor data structure;

using said trifocal tensor data structure to compute from pixels in said existing image a new view image; and wherein the step of computing said trifocal tensor data structure comprises computing three epipoles in said reference frame corresponding to said three viewpoints and computing the elements of said trifocal data structure from said three epipoles.

18. The process of claim 17 further comprising transforming said new view image in accordance with a projective transform between said initial viewpoint and said new viewpoint.

19. The process of claim 17 wherein the step of computing the elements of said trifocal tensor data structure from said three epipoles comprises computing a trifocal ratio and determining the orthogonal components of each of said parallax vectors, said trifocal ratio and said components of said parallax vectors comprising said elements of said trifocal tensor data structure.

20. The process of claim 17 wherein said reference frame comprises an image plane of one of said existing images.

21. The process of claim 20 wherein the step of transforming said existing images relative to one another comprises transforming the other of said existing images to align the image of said planar surface therein with the image of said planar surface in said one existing image.

22. A computer-readable medium storing information representing instructions for carrying out the steps of claim 17.

23. Apparatus for use in an image processing system for synthesizing a new image representing a new viewpoint of a scene from at least two existing images of the scene taken from different respective viewpoints, said apparatus comprising:
a processor;
a memory having executable instructions stored therein;
wherein the processor, in response to the instructions stored in the memory:
refers to a chosen planar surface visible in said at least two existing images;
transforms said at least two existing images relative to one another so as to bring said chosen planar surface into perspective alignment in said at least two existing images;
refers to a chosen reference frame and computes parallax vectors between said two images of the projection of common scene points on said reference frame;
refers to a specified image parameter on said reference frame of said new viewpoint, and constructs from said image parameter and from said parallax vectors a trifocal tensor data structure;
computes scene points in said new view from the scene points in said existing images using said trifocal tensor data structure, to produce said synthesized new view image; and
wherein said image parameter of said new view comprises information sufficient, together with said parallax vectors, to deduce: (a) a trifocal ratio in the reference frame and (b) one epipole between the new viewpoint and one of said first and second viewpoints.

24. The apparatus of claim 23 wherein said reference frame comprises an image plane of a first one of said existing images.

25. The apparatus of claim 23 wherein said reference frame is co-planar with said planar surface.

26. The apparatus of claim 24 wherein said processor transforms said existing images by performing a projective transform on a second one of said existing images to bring its image of said planar surface into perspective alignment with the image of said planar surface in said first existing image.

27. The apparatus of claim 23 wherein said image parameter of said new view comprises said trifocal ratio and said one epipole.

28. The apparatus of claim 23 wherein said image parameter of said new view comprises the projection onto said reference frame from said new viewpoint of at least two different scene points visible in said existing images.

29. The apparatus of claim 28 wherein said processor constructs said trifocal tensor data structure in that said processor:
computes, from said parallax vectors and from said projection of said scene points, three epipoles corresponding to views of each one of said two visible scene points from, respectively, said first viewpoint, said second viewpoint and said new viewpoint.

30. The apparatus of claim 29 wherein said processor constructs said a trifocal tensor data structure in that said processor further:
computes from said three epipoles a trifocal ratio; and
computes elements of said trifocal tensor data structure from said trifocal ratio and from said three epipoles.

31. The apparatus of claim 23 wherein said image parameter of said new view comprises information sufficient, together with said parallax vectors, to compute three epipoles on said reference frame corresponding to pairs of said first, second and new viewpoints.

32. The apparatus of claim 21 wherein said image parameter of said new view comprises said three epipoles.

33. The apparatus of claim 32 wherein said processor constructs said trifocal tensor data structure in that said processor further:
computes from said three epipoles a trifocal ratio; and
computes elements of said trifocal tensor data structure from said trifocal ratio and from said three epipoles.

34. The apparatus of claim 31 wherein said image parameter of said new view comprises the projection onto said reference frame from said new viewpoint of at least two different scene points visible in said existing images.

35. The apparatus of claim 34 wherein said processor constructs said trifocal tensor data structure in that said processor:
computes, from said parallax vectors and from said projection of said scene points, three epipoles corresponding to views of each one of said two visible scene points from, respectively, said first viewpoint, said second viewpoint and said new viewpoint.

36. The apparatus of claim 35 wherein said processor constructs said trifocal tensor data structure in that said processor further:
computes from said three epipoles a trifocal ratio; and
computes elements of said trifocal tensor data structure from said trifocal ratio and from said three epipoles.

37. The apparatus of claim 23 wherein said processor, in further further response to said instructions, transforms said synthesized new view image by a projective transform corresponding to a homography between said reference frame and said new viewpoint.

38. Apparatus for use in an image processing system for synthesizing an image of a scene in accordance with a new viewpoint from a pair of existing images of the scene taken from respective initial viewpoints, said apparatus comprising:
a processor;
a memory having executable instructions store therein;
wherein the processor, in response to the instructions stored in the memory:
refers to a chosen planar surface visible in said two existing images and transforms said existing images relative to one another so as to bring said planar surface into perspective alignment in said at least two existing images;
refers to a selected reference frame and at least two scene points in said existing image, and determines the projection on the reference frame of parallax vectors between the two images of said two scene points;
refers to a new viewpoint specified by a projection on the reference frame of said two scene points as viewed from the new viewpoint;

computes parallax vectors between said initial viewpoints and said new viewpoint of said projections of said two scene points;

computes from said parallax vectors of said three scene points a trifocal tensor data structure;

compute from pixels in said existing image a new view image using said trifocal tensor data structure; and wherein said processor computes said trifocal tensor data structure in that said processor computes three epipoles in said reference frame corresponding to said three viewpoints and computes the elements of said trifocal tensor data structure from said three epipoles.

39. The apparatus of claim 38 wherein said processor, in further response to said instructions, transforms said new view image in accordance with a projective transform between said initial viewpoint and said new viewpoint.

40. The apparatus of claim 38 wherein said processor computes the elements of said trifocal tensor data structure from said three epipoles in that said processor computes a trifocal ratio and determines the orthogonal components of each of said parallax vectors.

41. The apparatus of claim 40 wherein said trifocal ratio and said components of said parallax vectors comprise said elements of said trifocal tensor data structure.

42. The apparatus of claim 38 wherein said reference frame comprises an image plane of one of said existing images.

43. The apparatus of claim 42 wherein said processor transforms said existing images relative to one another in that said processor transforms the other of said existing images to align the image of said planar surface therein with the image of said planar surface in said one existing image.

* * * * *